US012600190B2

(12) United States Patent
Gagnon et al.

(10) Patent No.: US 12,600,190 B2
(45) Date of Patent: Apr. 14, 2026

(54) SNOWMOBILE WITH FRONT SUSPENSION ASSEMBLIES

(71) Applicant: BOMBARDIER RECREATIONAL PRODUCTS INC., Valcourt (CA)

(72) Inventors: Pascal Gagnon, Sherbrooke (CA); Maxime Boisvert, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 19/062,637

(22) Filed: Feb. 25, 2025

(65) Prior Publication Data

US 2025/0187388 A1 Jun. 12, 2025

Related U.S. Application Data

(63) Continuation of application No. 18/538,028, filed on Dec. 13, 2023, now Pat. No. 12,251,975, which is a (Continued)

(51) Int. Cl.
B60G 17/019 (2006.01)
B60G 5/00 (2006.01)
(Continued)

(52) U.S. Cl.
CPC ....... B60G 17/01933 (2013.01); B60G 5/005 (2013.01); B60G 5/02 (2013.01); (Continued)

(58) Field of Classification Search
CPC .......... B60W 2300/44; B60G 2200/13; B60G 2200/144; B60G 2204/16; (Continued)

(56) References Cited

U.S. PATENT DOCUMENTS 6,206,124 B1 3/2001 Mallette et al.
7,322,435 B2 1/2008 Lillbacka et al.
(Continued)

FOREIGN PATENT DOCUMENTS

CA 2639857 C * 4/2012 ............. B62D 55/07

OTHER PUBLICATIONS

Lynx Snowmobiles, "Lynx Electric Damping Control—Finnish", Apr. 16, 2014, retrieved from https://www.youtube.com/watch?v=tKp44vpMscl Oct. 28, 2024.

*Primary Examiner* — James A English
(74) *Attorney, Agent, or Firm* — BCF LLP

(57) ABSTRACT

A snowmobile including a right front suspension assembly and a left front suspension assembly, each of the left and right front suspension assembly including: a ski leg; an upper A-arm and a lower A-arm, the upper and lower A-arms being connected between the ski leg and the chassis; and a shock absorber connected between one of the upper and lower A-arms and the chassis; a first sensor connected between one of the upper and lower A-arms of the right front suspension assembly and the chassis to measure the angle therebetween; a second sensor connected between one of the upper and lower A-arms of the left front suspension assembly and the chassis to measure the angle therebetween; and a controller communicatively connected to the first sensor and the second sensor, the electronic signals representing angular position between the A-arms of the right and left front suspension assembly and the chassis.

8 Claims, 29 Drawing Sheets

Related U.S. Application Data continuation of application No. 17/945,791, filed on Sep. 15, 2022, now Pat. No. 11,890,911, which is a continuation of application No. 16/705,526, filed on Dec. 6, 2019, now Pat. No. 11,458,795, which is a continuation-in-part of application No. 16/519,980, filed on Jul. 23, 2019, now abandoned.

(60) Provisional application No. 62/711,116, filed on Jul. 27, 2018.

(51) Int. Cl.
B60G 5/02 (2006.01)
B60G 15/06 (2006.01)

(52) U.S. Cl.
CPC ...... *B60G 15/067* (2013.01); *B60G 2300/322* (2013.01); *B60G 2600/1877* (2013.01); *B60G 2800/87* (2013.01)

(58) Field of Classification Search
CPC .......... B60G 2300/322; B60G 2600/02; B60G 2600/184; B60G 2600/1877; B60G 2800/87; B60G 2800/162; B60G 2400/05162; B60G 2400/252; B60G 17/01933; B60G 17/06; B60G 17/067; B60G 5/005; B60G 5/02; B62M 2027/026; B62M 2027/02; B62M 2027/025; B62D 55/07; B62D 55/10; B62D 55/12; B62D 55/14
See application file for complete search history.

(56) References Cited

U.S. PATENT DOCUMENTS

| | | | | |
|---|---|---|---|---|
| 8,037,961 | B2 * | 10/2011 | Fecteau | B62M 27/02 180/190 |
| 9,114,852 | B2 | 8/2015 | Fecteau et al. | |
| 9,145,037 | B2 | 9/2015 | Hawksworth et al. | |
| 9,428,028 | B2 | 8/2016 | Hawksworth et al. | |
| 9,527,362 | B2 * | 12/2016 | Brady | B60G 17/0162 |
| 2006/0121970 | A1 | 6/2006 | Khal | |
| 2009/0321167 | A1 | 12/2009 | Simmons | |
| 2014/0125018 | A1 * | 5/2014 | Brady | B60G 17/016 280/5.519 |
| 2014/0353933 | A1 | 12/2014 | Hawksworth et al. | |
| 2016/0121970 | A1 | 5/2016 | Labbe et al. | |
| 2018/0099675 | A1 | 4/2018 | Boisvert et al. | |
| 2020/0247383 | A1 | 8/2020 | Aitcin et al. | |
| 2021/0163086 | A1 * | 6/2021 | Mallette | B62D 55/112 |
| 2021/0276388 | A1 * | 9/2021 | Ishibashi | B60G 17/01908 |
| 2021/0362806 | A1 | 11/2021 | Hedlund et al. | |

* cited by examiner

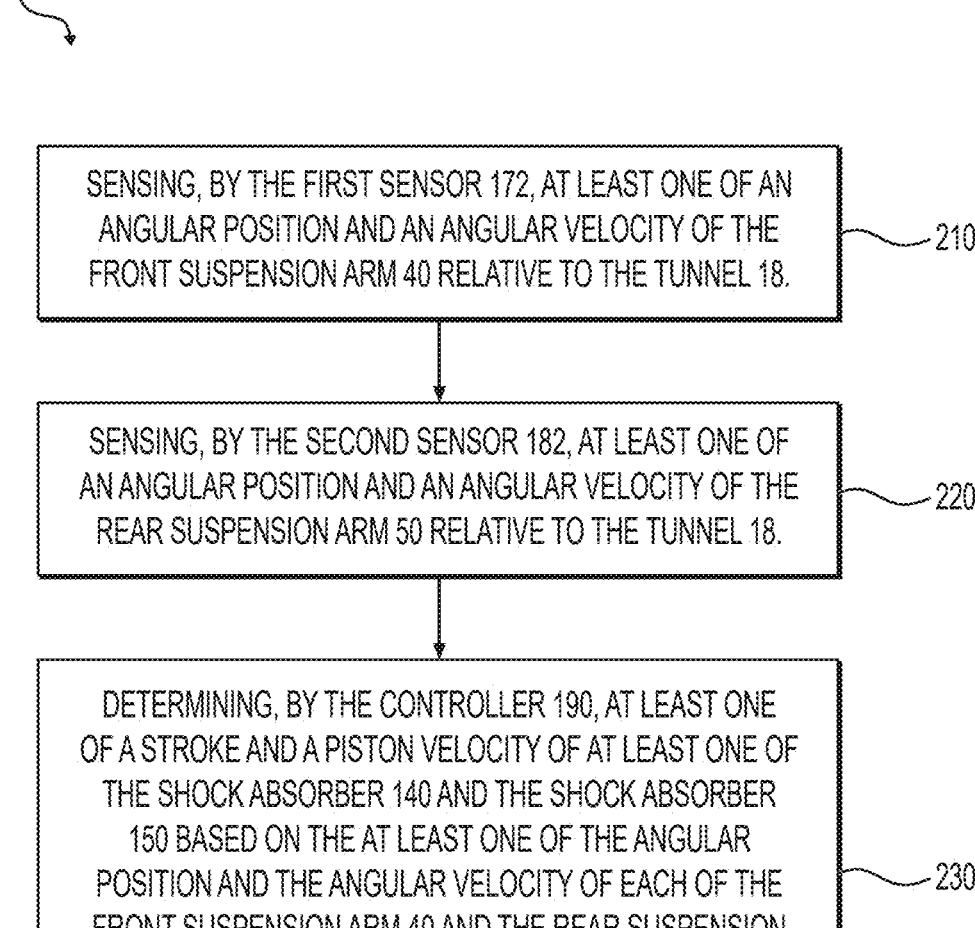

200

SENSING, BY THE FIRST SENSOR 172, AT LEAST ONE OF AN ANGULAR POSITION AND AN ANGULAR VELOCITY OF THE FRONT SUSPENSION ARM 40 RELATIVE TO THE TUNNEL 18.          210

SENSING, BY THE SECOND SENSOR 182, AT LEAST ONE OF AN ANGULAR POSITION AND AN ANGULAR VELOCITY OF THE REAR SUSPENSION ARM 50 RELATIVE TO THE TUNNEL 18.          220

DETERMINING, BY THE CONTROLLER 190, AT LEAST ONE OF A STROKE AND A PISTON VELOCITY OF AT LEAST ONE OF THE SHOCK ABSORBER 140 AND THE SHOCK ABSORBER 150 BASED ON THE AT LEAST ONE OF THE ANGULAR POSITION AND THE ANGULAR VELOCITY OF EACH OF THE FRONT SUSPENSION ARM 40 AND THE REAR SUSPENSION ARM 50 AS SENSED BY THE FRONT SENSOR 172 AND THE REAR SENSOR 182 RESPECTIVELY.          230

*FIG. 22*

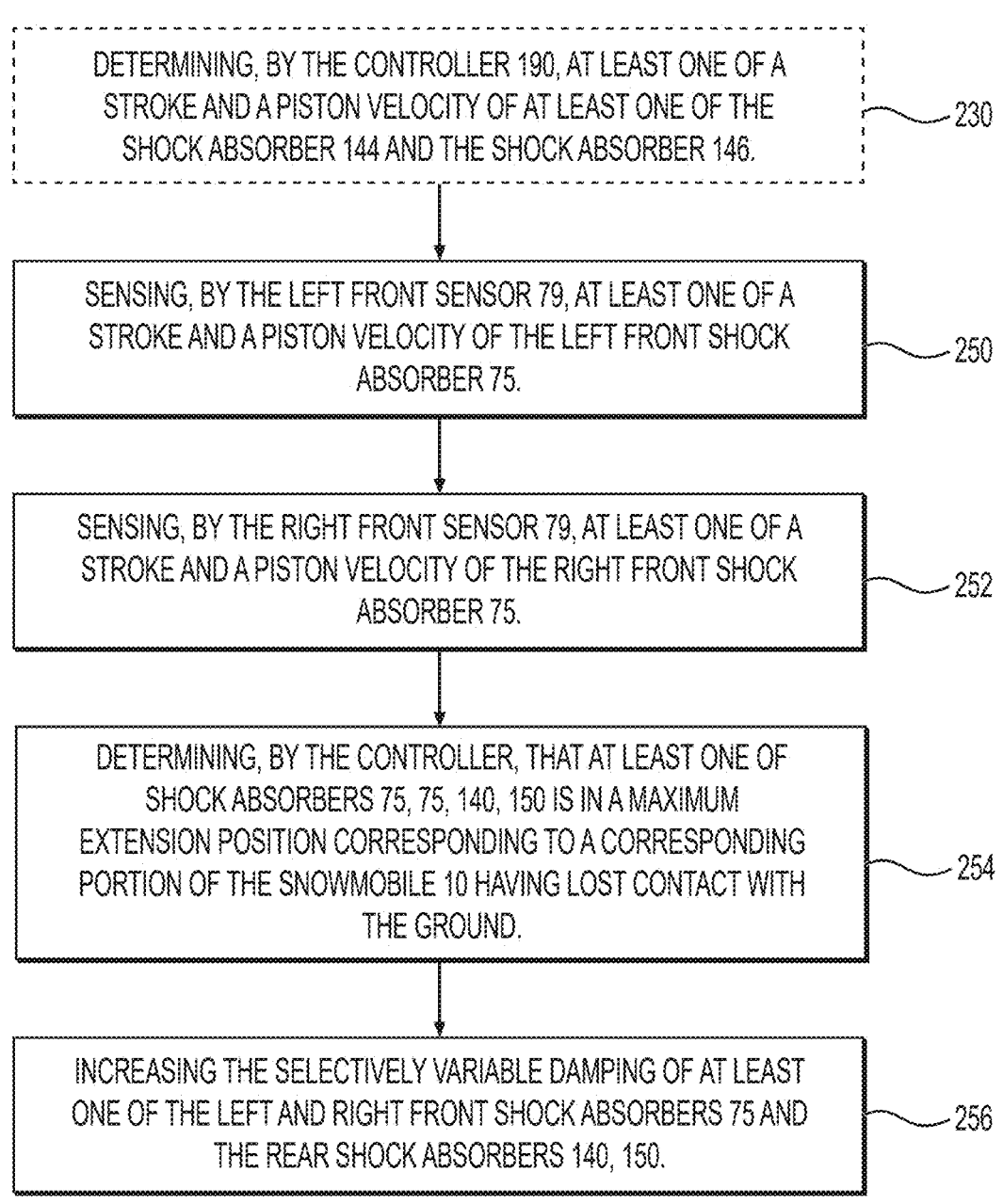

DETERMINING, BY THE CONTROLLER 190, AT LEAST ONE OF A STROKE AND A PISTON VELOCITY OF AT LEAST ONE OF THE SHOCK ABSORBER 144 AND THE SHOCK ABSORBER 146. — 230

SENSING, BY THE LEFT FRONT SENSOR 79, AT LEAST ONE OF A STROKE AND A PISTON VELOCITY OF THE LEFT FRONT SHOCK ABSORBER 75. — 250

SENSING, BY THE RIGHT FRONT SENSOR 79, AT LEAST ONE OF A STROKE AND A PISTON VELOCITY OF THE RIGHT FRONT SHOCK ABSORBER 75. — 252

DETERMINING, BY THE CONTROLLER, THAT AT LEAST ONE OF SHOCK ABSORBERS 75, 75, 140, 150 IS IN A MAXIMUM EXTENSION POSITION CORRESPONDING TO A CORRESPONDING PORTION OF THE SNOWMOBILE 10 HAVING LOST CONTACT WITH THE GROUND. — 254

INCREASING THE SELECTIVELY VARIABLE DAMPING OF AT LEAST ONE OF THE LEFT AND RIGHT FRONT SHOCK ABSORBERS 75 AND THE REAR SHOCK ABSORBERS 140, 150. — 256

*FIG. 24*

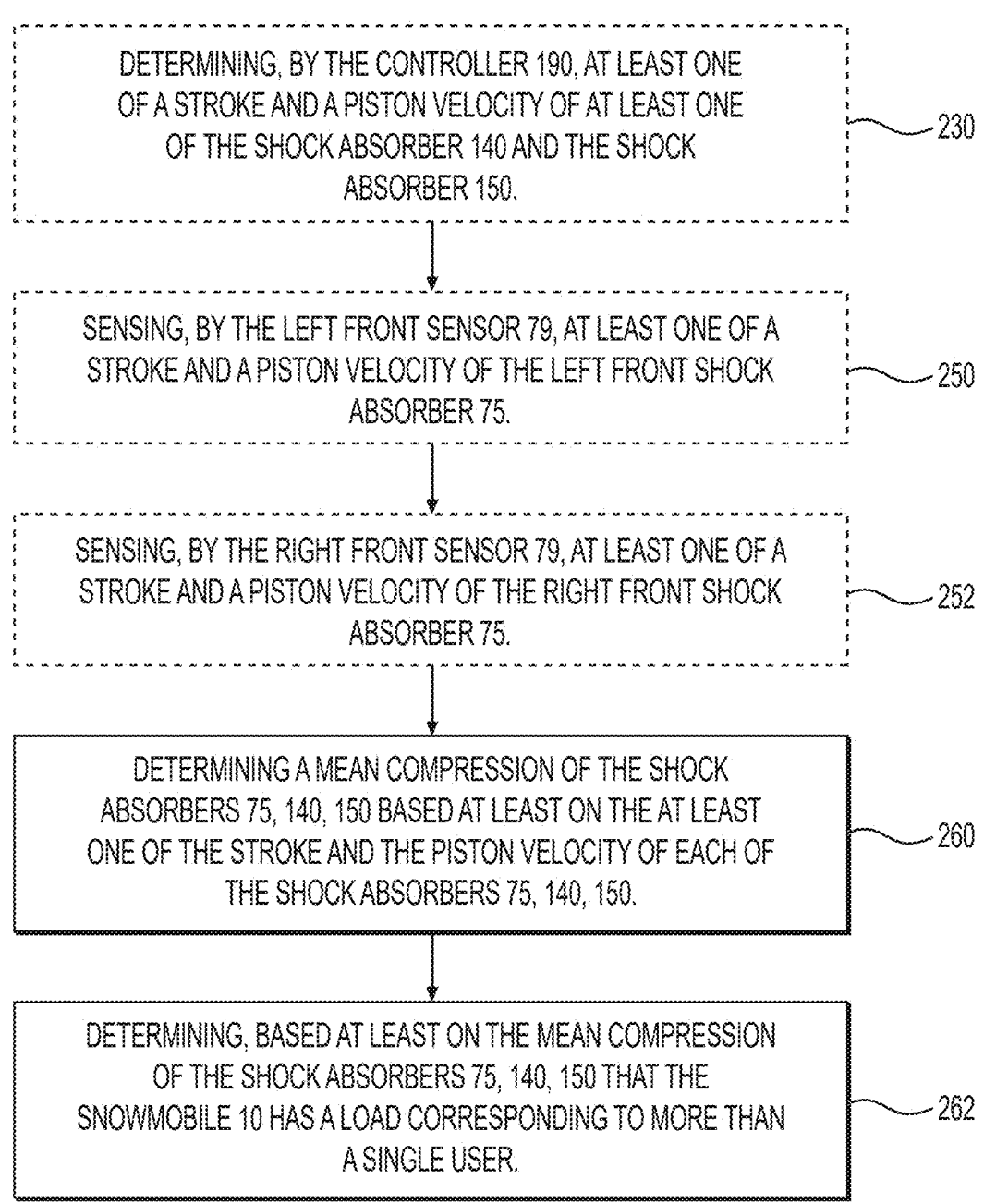

DETERMINING, BY THE CONTROLLER 190, AT LEAST ONE OF A STROKE AND A PISTON VELOCITY OF AT LEAST ONE OF THE SHOCK ABSORBER 140 AND THE SHOCK ABSORBER 150. — 230

SENSING, BY THE LEFT FRONT SENSOR 79, AT LEAST ONE OF A STROKE AND A PISTON VELOCITY OF THE LEFT FRONT SHOCK ABSORBER 75. — 250

SENSING, BY THE RIGHT FRONT SENSOR 79, AT LEAST ONE OF A STROKE AND A PISTON VELOCITY OF THE RIGHT FRONT SHOCK ABSORBER 75. — 252

DETERMINING A MEAN COMPRESSION OF THE SHOCK ABSORBERS 75, 140, 150 BASED AT LEAST ON THE AT LEAST ONE OF THE STROKE AND THE PISTON VELOCITY OF EACH OF THE SHOCK ABSORBERS 75, 140, 150. — 260

DETERMINING, BASED AT LEAST ON THE MEAN COMPRESSION OF THE SHOCK ABSORBERS 75, 140, 150 THAT THE SNOWMOBILE 10 HAS A LOAD CORRESPONDING TO MORE THAN A SINGLE USER. — 262

*FIG. 25*

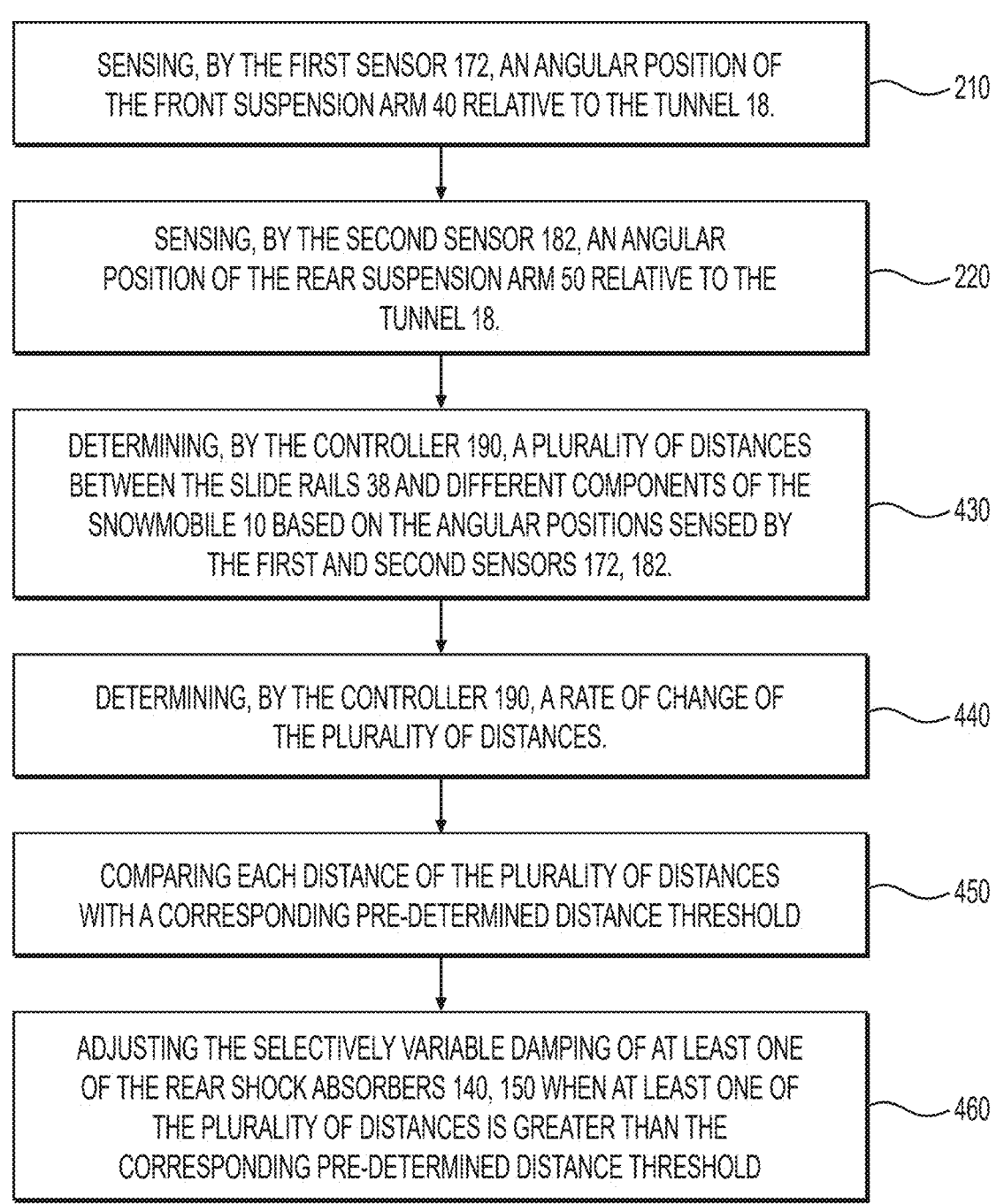

SENSING, BY THE FIRST SENSOR 172, AN ANGULAR POSITION OF THE FRONT SUSPENSION ARM 40 RELATIVE TO THE TUNNEL 18. — 210

SENSING, BY THE SECOND SENSOR 182, AN ANGULAR POSITION OF THE REAR SUSPENSION ARM 50 RELATIVE TO THE TUNNEL 18. — 220

DETERMINING, BY THE CONTROLLER 190, A PLURALITY OF DISTANCES BETWEEN THE SLIDE RAILS 38 AND DIFFERENT COMPONENTS OF THE SNOWMOBILE 10 BASED ON THE ANGULAR POSITIONS SENSED BY THE FIRST AND SECOND SENSORS 172, 182. — 430

DETERMINING, BY THE CONTROLLER 190, A RATE OF CHANGE OF THE PLURALITY OF DISTANCES. — 440

COMPARING EACH DISTANCE OF THE PLURALITY OF DISTANCES WITH A CORRESPONDING PRE-DETERMINED DISTANCE THRESHOLD — 450

ADJUSTING THE SELECTIVELY VARIABLE DAMPING OF AT LEAST ONE OF THE REAR SHOCK ABSORBERS 140, 150 WHEN AT LEAST ONE OF THE PLURALITY OF DISTANCES IS GREATER THAN THE CORRESPONDING PRE-DETERMINED DISTANCE THRESHOLD — 460

*FIG. 26*

SNOWMOBILE WITH FRONT SUSPENSION ASSEMBLIES

CROSS-REFERENCE

The present application is a continuation of U.S. patent application Ser. No. 18/538,028, filed on Dec. 13, 2023, which is a continuation of U.S. patent application Ser. No. 17/945,791, filed Sep. 15, 2022, which is a continuation of U.S. patent application Ser. No. 16/705,526, filed on Dec. 6, 2019, which is a continuation-in-part of U.S. patent application Ser. No. 16/519,980, filed on Jul. 23, 2019, which in turn claims priority to U.S. Provisional Patent Application No. 62/711,116, filed on Jul. 27, 2018, the entirety of each of which is incorporated herein by reference.

FIELD OF TECHNOLOGY

The present technology relates to suspension assemblies for a snowmobile.

BACKGROUND

Snowmobiles are driven by endless drive tracks supported and tensioned by rear suspension assemblies. Some such rear suspension assemblies include control systems in order to adjust suspension characteristics, generally prior to use. For example, some snowmobiles have an adjustable rear suspension assembly which allows for different user-selected suspension settings, such as sport mode or touring mode, which adjust the damping levels of shock absorbers to provide a stiffer or softer ride.

In some snowmobiles, the rear suspension assemblies are arranged in geometries that result in what is known as an uncoupled rear suspension assembly. In an uncoupled rear suspension assembly, the front and rear portions of the slide frame move independently from each other. For example, when the snowmobile moves forward and the rear suspension assembly encounters a bump, the front portion of the slide frame moves toward the tunnel while the rear portion of the slide frame will not move toward the tunnel until it also encounters the bump. In an uncoupled rear suspension assembly, the slide frame can pivot relative to the tunnel as seen from the side of the snowmobile.

In some vehicles, it is known to include active control of suspensions systems, in order to adjust the damping strength of shock absorbers to aid in improving the ride of the vehicle. In such cases, adjustments to damping strengths of one or more of the shock absorbers are made based on the piston position or speed of the shock absorbers expanding or contracting. Generally, a sensor connected to a rigid member of the suspension assembly is included in such systems to determine the piston movement.

In uncoupled suspension assemblies, however, as the forward portion of the suspension assembly can move separately from the rearward portion, the shock absorbers of the rear suspension assemblies can be in various positions relative to the rigid members of the suspension assembly. A sensor connected to the suspension assembly would therefore not be able to determine the piston movement or position of the two shock absorbers of such a rear suspension assembly.

There is therefore a need for a rear suspension assembly which allows for active control of suspension damping, even in uncoupled rear suspension assemblies.

SUMMARY

It is an object of the present technology to ameliorate at least some of the inconveniences present in the prior art.

According to one aspect of the present technology, there is provided a snowmobile and a rear suspension assembly including two sensors for sensing the angular position and angular velocities of the two rear suspension arms. Utilizing two sensors, the stroke and piston velocity of the two rear shock absorbers can be determined, even for uncoupled rear suspension geometries. While this may also be determined by using shock absorbers with internal sensors, the position sensors and shock absorbers described herein are generally less expensive and less complicated to repair or replace than combined shock absorbers and sensors.

According to one aspect of the present technology, there is provided a snowmobile including a chassis including a tunnel; a motor connected to the chassis; at least one ski connected to the chassis; an endless drive track disposed at least in part below the tunnel and operatively connected to the motor for propulsion of the snowmobile; and a rear suspension assembly supporting and tensioning the endless drive track. The rear suspension assembly includes a front suspension arm having an upper end and a lower end, the upper end of the front suspension arm being pivotably connected to the tunnel; a rear suspension arm having an upper end and a lower end, the upper end of the rear suspension arm being pivotably connected to the tunnel; a pair of slide rails pivotably connected to the lower end of the front suspension arm and to the lower end of the rear suspension arm; a first rear shock absorber connected between the front suspension arm and the pair of slide rails, the first rear shock absorber biasing the pair of slide rails away from the tunnel; and a second rear shock absorber connected between the rear suspension arm and one of the front suspension arm and the pair of slide rails. The snowmobile also includes a first sensor, a second sensor and a controller. The first sensor is configured for sensing an angular position of the front suspension arm relative to one of the tunnel and a component of the rear suspension assembly near the front suspension arm. The first sensor is operatively connected to the tunnel or the rear suspension assembly. The second sensor is configured for sensing an angular position of the rear suspension arm relative to one of the tunnel and a component of the rear suspension assembly near the rear suspension arm. The second sensor is operatively connected to the tunnel or the rear suspension assembly. The controller is communicatively connected to the first sensor and the second sensor to receive electronic signals therefrom representative of the angular positions of the front and rear suspension arms respectively.

In some embodiments, at least one of the first rear shock absorber and the second rear shock absorber has selectively variable damping; and the at least one of the first rear shock absorber and the second rear shock absorber is communicatively connected to the controller to receive electronic signals for controlling the selectively variable damping.

In some embodiments, the controller controls the selectively variable damping of the at least one of the first rear shock absorber and the second rear shock absorber based at least in part on the signals received from the first sensor and the second sensor.

In some embodiments, the first sensor is operatively connected to the lower end of the front suspension arm; and the second sensor is operatively connected between the tunnel and the upper end of the rear suspension arm.

In some embodiments, the second sensor is fastened to the tunnel; and the second sensor is connected to the upper end of the rear suspension arm via at least one linkage fastened between the second sensor and the rear suspension arm.

In some embodiments, the snowmobile also includes a rocker arm having an upper end and a lower end, the upper end of the rocker arm being pivotably connected to the lower end of the rear suspension arm, the lower end of the rocker arm being pivotably connected to the pair of slide rails.

In some embodiments, at least one of the pair of slide rails includes at least one rear stopper; and the at least one rear stopper is disposed within a range of motion of the rocker arm, the rocker arm abutting the at least one rear stopper when the rocker arm extends rearward.

In some embodiments, the controller is adapted for determining, based on the angular positions sensed by the first sensor and the second sensor, at least two distances between the slide rails and the tunnel.

In some embodiments, the controller is adapted for determining, based on the angular positions sensed by the first sensor and the second sensor, at least one distance associated with the rear suspension assembly.

In some embodiments, the rear suspension assembly further comprises a plurality of idler wheels mounted to the slide rails, the plurality of idler wheels including a set of rear idler wheels positioned rearward of the rear suspension arm; and the at least one distance includes a distance between an uppermost point of the rear idler wheels and an inner surface of a top wall of the tunnel.

In some embodiments, the at least one distance includes at least one of: a first distance between the slide rails and the upper end of the rear suspension arm; a second distance between the slide rails and a pivot interconnecting the rear suspension arm and the chassis; a third distance between a connection point between the slide rails and the first rear shock absorber and an upper end of the first rear shock absorber; and a fourth distance between the slide rails and the upper end of the front suspension arm.

In some embodiments, the controller is adapted for determining a rate of change of the at least one distance.

In some embodiments, at least one of the first rear shock absorber and the second rear shock absorber has selectively variable damping; the at least one of the first rear shock absorber and the second rear shock absorber is communicatively connected to the controller to receive electronic signals for controlling the selectively variable damping thereof; and the controller is adapted to: compare each distance of the at least one distance with a corresponding pre-determined distance threshold; and adjust the selectively variable damping of the at least one of the first rear shock absorber and the second rear shock absorber when the at least one of the at least one distance is greater than the corresponding pre-determined distance threshold.

In some embodiments, the one of the tunnel and the component of the rear suspension assembly near the front suspension arm is the component of the rear suspension assembly near the front suspension arm. The component of the rear suspension assembly near the front suspension arm is one of the slide rails. The first sensor is operatively connected to the rear suspension assembly. The first sensor is operatively connected to one of: the one of the slide rails; and the front suspension arm.

In some embodiments, the snowmobile further comprises a rocker arm having an upper end and a lower end, the upper end of the rocker arm being pivotably connected to the lower end of the rear suspension arm, the lower end of the rocker arm being pivotably connected to the pair of slide rails. The one of the tunnel and the component of the rear suspension assembly near the rear suspension arm is the component of the rear suspension assembly near the rear suspension arm. The component of the rear suspension assembly near the rear suspension arm is one of: one of the slide rails; and the rocker arm. The second sensor is operatively connected to the rear suspension assembly; and the second sensor is operatively connected to one of: the one of the slide rails; the rocker arm; and the rear suspension arm.

According to another aspect of the present technology, there is provided a method of controlling a rear suspension assembly of a snowmobile. The method includes: sensing, by a first sensor, at least one of an angular position and an angular velocity of a front suspension arm of the rear suspension assembly relative to one of a tunnel of the snowmobile and a component of the rear suspension assembly near the front suspension arm, a first rear shock absorber being connected between the front suspension arm and a pair of slide rails of the rear suspension assembly; sensing, by a second sensor, at least one of an angular position and an angular velocity of a rear suspension arm of the rear suspension assembly relative to one of the tunnel of the snowmobile and a component of the rear suspension assembly near the rear suspension arm, a second rear shock absorber being connected between the rear suspension arm and one of the front suspension arm and the pair of slide rails; and determining, by a controller communicatively connected to the first sensor and the second sensor, at least one of a stroke and a piston velocity of at least one of the first rear shock absorber and the second rear shock absorber based on the at least one of the angular position and the angular velocity of each of the front suspension arm and the rear suspension arm as sensed by the first sensor and the second sensor respectively.

In some embodiments, sensing, by the first sensor, the at least one of the angular position and the angular velocity of the front suspension arm includes sensing the at least one of the angular position and the angular velocity of an upper end of the front suspension arm; and sensing, by the second sensor, the at least one of the angular position and the angular velocity of the rear suspension arm includes sensing the at least one of the angular position and the angular velocity of an upper end of the rear suspension arm.

In some implementations, the method also includes receiving, by the controller, an indication of a user-selected suspension setting; and in response to receiving the indication of the user-selected suspension setting, adjusting, by the controller, a current supplied to the one or both of the first rear shock absorber and the second rear shock absorber based on the user-selected suspension setting, the one or both of the first rear shock absorber and the second rear shock absorber having a selectively variable damping controlled by the current supplied thereto.

In some embodiments, the method also includes determining, by the controller, at least one distance associated with the rear suspension assembly based on the angular positions of the front and rear suspension arms sensed by the first sensor and the second sensor.

In some embodiments, the at least one distance includes at least one of: a first distance between the slide rails and an upper end of the rear suspension arm; a second distance between the slide rails and a pivot interconnecting the rear suspension arm and the tunnel; a third distance between a connection point between the slide rails and the first rear shock absorber and an upper end of the first rear shock absorber; a fourth distance between the slide rails and an upper end of the front suspension arm; and a fifth distance between an uppermost point of the rear idler wheels of the rear suspension assembly and an inner surface of a top wall of the tunnel.

In some embodiments, the method also includes determining, by the controller, a rate of change of the at least one distance.

In some embodiments, the method also includes: comparing, by the controller, each distance of the at least one distance with a corresponding pre-determined distance threshold; and adjusting a selectively variable damping of one or both of the first rear shock absorber and the second rear shock absorber when at least one of the at least one distance is greater than the corresponding pre-determined distance threshold.

According to yet another aspect of the present technology, there is provided a snowmobile including a chassis including a tunnel; a motor connected to the chassis; at least one ski connected to the chassis; an endless drive track disposed at least in part below the tunnel and operatively connected to the motor for propulsion of the snowmobile; a rear suspension assembly supporting and tensioning the endless drive track, the rear suspension assembly including: a front suspension arm having an upper end and a lower end, the upper end of the front suspension arm being pivotably connected to the tunnel; a rear suspension arm having an upper end and a lower end, the upper end of the rear suspension arm being pivotably connected to the tunnel; a pair of slide rails pivotably connected to the lower end of the front suspension arm and to the lower end of the rear suspension arm; a first rear shock absorber connected between the front suspension arm and the pair of slide rails, the first rear shock absorber biasing the pair of slide rails away from the tunnel; and a second rear shock absorber connected between the rear suspension arm and one of the front suspension arm and the pair of slide rails; at least one sensor for sensing an angular position of one of the front suspension arm and the rear suspension arm relative to one of the tunnel and a component of the rear suspension assembly near at least one of the front suspension arm and the rear suspension arm, the at least one sensor being operatively connected to one of: the tunnel, and the rear suspension assembly; and a controller communicatively connected to the at least one sensor to receive electronic signals therefrom representative of the angular position of the one of the front and rear suspension arms.

In some embodiments, at least one of the first rear shock absorber and the second rear shock absorber has selectively variable damping; and the at least one of the first rear shock absorber and the second rear shock absorber is communicatively connected to the controller for controlling the selectively variable damping.

In some embodiments, the controller controls the selectively variable damping of the at least one of the first rear shock absorber and the second rear shock absorber based at least in part on the electronic signals received from the at least one sensor.

In some embodiments, the at least one sensor is fastened to the tunnel; and the at least one sensor is connected to the upper end of the rear suspension arm via at least one linkage fastened between the at least one sensor and the rear suspension arm.

In some embodiments, the snowmobile further includes a rocker arm having an upper end and a lower end, the upper end of the rocker arm being pivotably connected to the lower end of the rear suspension arm, the lower end of the rocker arm being pivotably connected to the pair of slide rails.

In some embodiments, the component of the rear suspension assembly near the front suspension arm is one of the slide rails; the at least one sensor is operatively connected to the rear suspension assembly; and the at least one sensor is operatively connected to one of: the one of the slide rails; and the front suspension arm.

In some embodiments, the snowmobile further comprises a rocker arm having an upper end and a lower end, the upper end of the rocker arm being pivotably connected to the lower end of the rear suspension arm, the lower end of the rocker arm being pivotably connected to the pair of slide rails; the component of the rear suspension assembly near the rear suspension arm is one of: one of the slide rails; and the rocker arm; the at least one sensor is operatively connected to the rear suspension assembly; and the at least one sensor is operatively connected to one of: the one of the slide rails; the rocker arm; and the rear suspension arm.

According to yet another aspect of the present technology, there is provided a snowmobile including a chassis including a tunnel; a motor connected to the chassis; at least one ski connected to the chassis; an endless drive track disposed at least in part below the tunnel and operatively connected to the motor for propulsion of the snowmobile; a rear suspension assembly supporting and tensioning the endless drive track, the rear suspension assembly including: at least one suspension arm having an upper end and a lower end, the upper end of the at least one suspension arm being pivotably connected to the tunnel; at least one slide rail pivotably connected to the at least one suspension arm; at least one shock absorber connected between the at least one suspension arm and the at least one slide rail, the at least one shock absorber biasing the at least one slide rail away from the tunnel, the at least one shock absorbing having variable damping characteristics; at least one sensor for sensing at least parameter of the rear suspension assembly; and a controller communicatively connected to the at least one sensor and the at least one shock absorber to alter the damping characteristics of the at least one shock absorber based on the at least one parameter.

In some embodiments, the controller controls the selectively variable damping of the at least one rear shock absorber based at least in part on the electronic signals received from the at least one sensor.

In some embodiments, the at least one sensor is operatively connected to the lower end of the at least one suspension arm.

In some embodiments, the at least one sensor is operatively connected between the tunnel and the upper end of the at least one suspension arm.

In some aspects, the technology described herein relates to a snowmobile including: a chassis including a tunnel; a motor connected to the chassis; at least one ski connected to the chassis; an endless drive track disposed at least in part below the tunnel and operatively connected to the motor for propulsion of the snowmobile; a rear suspension assembly supporting and tensioning the endless drive track, the rear suspension assembly including: at least one suspension arm having an upper end and a lower end, the upper end of the at least one suspension arm being pivotably connected to the tunnel; a pair of slide rails pivotably connected to the lower end of the at least one suspension arm; and at least one rear shock absorber biasing the pair of slide rails away from the tunnel; a right front suspension assembly and a left front suspension assembly, each of the left and right front suspension assembly including: a ski leg; an upper A-arm and a lower A-arm, the upper and lower A-arms being connected between the ski leg and the chassis; and a shock absorber connected between one of the upper and lower A-arms and the chassis; a first sensor connected between one of the upper and lower A-arms of the right front suspension assembly and the chassis to measure the angle between the one of the upper and lower A-arms and the chassis; a second sensor connected between one of the upper and lower A-arms of the left front suspension assembly and the chassis to measure the angle between the one of the upper and lower A-arms and the chassis; and a controller communicatively connected to the first sensor and the second sensor to receive electronic signals therefrom, the electronic signals representing angular position between the one of the upper and lower A-arms of the right front suspension assembly, the one of the upper and lower A-arms of the left front suspension assembly, and the chassis.

In some aspects, the techniques described herein relate to a snowmobile, wherein: the right front suspension assembly further includes two right rigid linkages connecting the first sensor to the upper A-arm of the right front suspension assembly; and the left front suspension assembly further includes two left rigid linkages connecting the second sensor to the upper A-arm of the left front suspension assembly.

In some aspects, the techniques described herein relate to a snowmobile, wherein the first sensor and the second sensor are connected to the chassis.

In some aspects, the techniques described herein relate to a snowmobile, wherein at least one of the shock absorber of the right front suspension assembly and the shock absorber of the left front suspension assembly has selectively variable damping.

In some aspects, the techniques described herein relate to a snowmobile, wherein the at least one of the shock absorber of the right front suspension assembly and the shock absorber of the left front suspension assembly is communicatively connected to the controller for controlling the selectively variable damping.

In some aspects, the techniques described herein relate to a snowmobile, wherein: the shock absorber of the right front suspension assembly has selectively variable damping; and the shock absorber of the left front suspension assembly has selectively variable damping.

In some aspects, the techniques described herein relate to a snowmobile, wherein, for each of the right and left front suspension assembly, the controller controls the selectively variable damping of the shock absorber based at least in part on the electronic signals received from a corresponding one of the first and second sensors.

In some aspects, the techniques described herein relate to a snowmobile, wherein, for each of the right and left front suspension assembly, the shock absorber is connected between the lower A-arm and the chassis.

For purposes of this application, terms related to spatial orientation such as forwardly, rearward, upwardly, downwardly, left, and right, are as they would normally be understood by a driver of the vehicle sitting thereon in a normal riding position.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Explanations and/or definitions of terms provided in the present application take precedence over explanations and/or definitions of these terms that may be found in any documents incorporated herein by reference.

Additional and/or alternative features, aspects and advantages of implementations of the present technology will become apparent from the following description, the accompanying drawings and the appended claims.

8

BRIEF DESCRIPTION OF THE DRAWINGS

For a better understanding of the present technology, as well as other aspects and further features thereof, reference is made to the following description which is to be used in conjunction with the accompanying drawings, where:

FIG. 22 is a flow chart illustrating a method of controlling the rear suspension assembly of FIG. 5 or FIG. 14, according to one embodiment of the present technology;

FIG. 24 is another flow chart illustrating additional possible steps in the method of FIG. 22;

FIG. 25 is yet another flow chart illustrating additional possible steps in the method of FIG. 22;

FIG. 26 is another flow chart illustrating other possible steps in the method of FIG. 22;

It should be noted that the Figures may not be drawn to scale.

DETAILED DESCRIPTION

Although the present technology is described below with respect to a snowmobile, it is contemplated that aspects of the present technology could be applied to other vehicles with suspensions supporting an endless drive track, including, but not limited to: side-by-side vehicles (SSVs) and all-terrain vehicles (ATVs).

Figure 1:
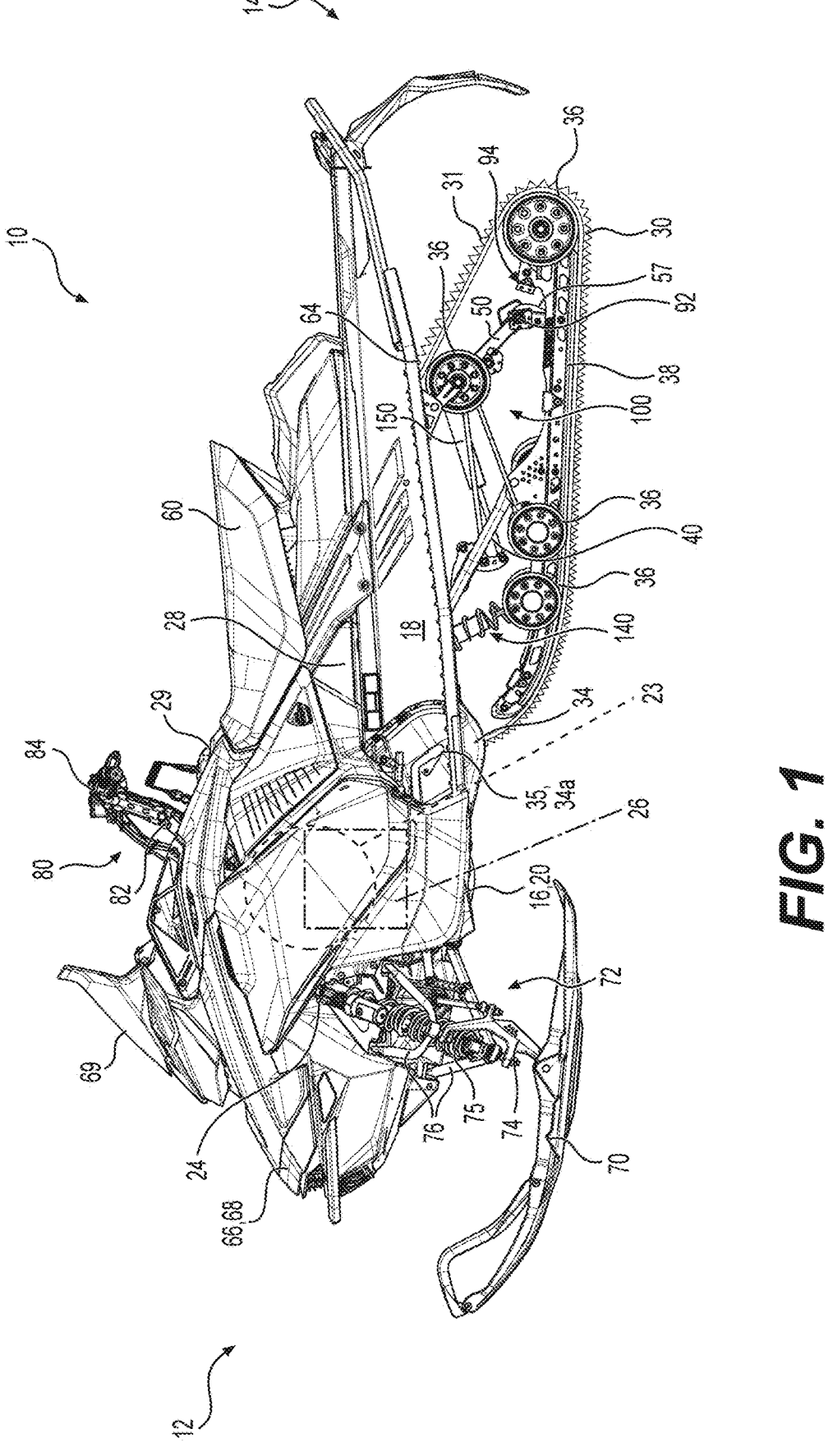
FIG. 1 is a left side elevation view of a snowmobile.

With reference to FIG. 1, a snowmobile 10 includes a front end 12 and a rear end 14 which are defined consistently with a forward travel direction of the vehicle 10. The snowmobile 10 includes a vehicle body in the form of a frame or chassis 16 which includes a rear tunnel 18, a motor module 20, and an upper structure 24. The tunnel 18 is formed from sheet metal parts assembled to form an inverted U-shape when viewed from the front or rear end 12, 14.

A motor 26, schematically illustrated in FIG. 1, is carried in a motor compartment defined by the motor module 20 of the chassis 16 and provides, in part, propulsion of the snowmobile 10. In the illustrated implementation, the motor 26 is an internal combustion engine 26, but it is contemplated that it could be, for example, an electric motor or a hybrid. A fuel tank 28, supported above the tunnel 18, supplies fuel to the engine 26 for its operation.

An endless drive track 30 is positioned generally under the tunnel 18, although it is contemplated that the drive track 30 could extend beyond the tunnel 18. The endless drive track 30 is operatively connected to the engine 26 via a drivetrain including a belt transmission system (not shown). The endless drive track 30 has a plurality of lugs 31 extending from an outer surface thereof to provide traction to the track 30. The endless drive track 30 is driven to run about a rear suspension assembly 100 connected to the chassis 16 for propulsion of the snowmobile 10.

The rear suspension assembly 100 includes a pair of drive sprockets 34 mounted on a drive axle 35, multiple idler wheels 36 and a pair of slide rails 38 in sliding contact with the endless drive track 30. The drive axle 35 having the drive sprockets 34 mounted thereon defines a drive axle axis 34*a*. The slide rails 38 are attached to the tunnel 18 by a front suspension arm 40 and a rear suspension arm 50. The rear suspension assembly 100 further includes a forward rear shock absorber 140, and a rearward rear shock absorber 150 disposed rearward of the shock absorber 140. The rear suspension assembly 100 will be described in more detail below.

A straddle seat 60 is positioned atop the fuel tank 28. The seat 60 is adapted to accommodate a driver of the snowmobile 10. The seat 60 can also be configured to accommodate a passenger. A fuel tank fill opening covered by a cap 29 is disposed on the upper surface of the fuel tank 28 in front of the seat 60. It is contemplated that the fuel tank fill opening could be disposed elsewhere on the fuel tank 28. A footrest 64 is positioned on each side of the snowmobile 10 below the seat 60 to accommodate the driver's feet. In the illustrated implementation, each side portion of the tunnel 18 is bent laterally outwardly at its bottom edge to form the corresponding footrest 64. It is however contemplated that the footrest 64 could be formed separately from and mounted to the tunnel 18.

At the front end 12 of the snowmobile 10, fairings 66 enclose the engine 26, the continuous variable transmission system 23 and other components of the powerpack such as the air intake system. The fairings 66 include a hood 68 which can be opened to allow access to the engine 26 and other internal components of the snowmobile 10 from the top and the front. A windshield 69 connected to the fairings 66 acts as a wind screen to lessen the force of the air on the rider while the snowmobile 10 is moving. In some implementations, the windshield 69 could be omitted.

Two skis 70 positioned at the forward end 12 of the snowmobile 10 are attached to the chassis 16 through corresponding front suspension assemblies 72. Each front suspension assembly 72 is operatively connected to the front end of the motor module 20. The front suspension assemblies 72 will be described in more detail below.

A steering assembly 80, including a steering column 82 and a handlebar 84, is provided generally forward of the seat 60. A lower end of the steering column 82 is connected to the skis 70. The handlebar 84 is attached to the upper end of the steering column 82 and is positioned in front of the seat 60. The handlebar 84 is used to rotate the steering column 82, and thereby the skis 70, in order to steer the vehicle 10.

The snowmobile 10 includes other components such as a display cluster, an exhaust system, an air intake system, and the like. As it is believed that these components would be readily recognized by one of ordinary skill in the art, further explanation and description of these components will not be provided herein.

Figure 2:
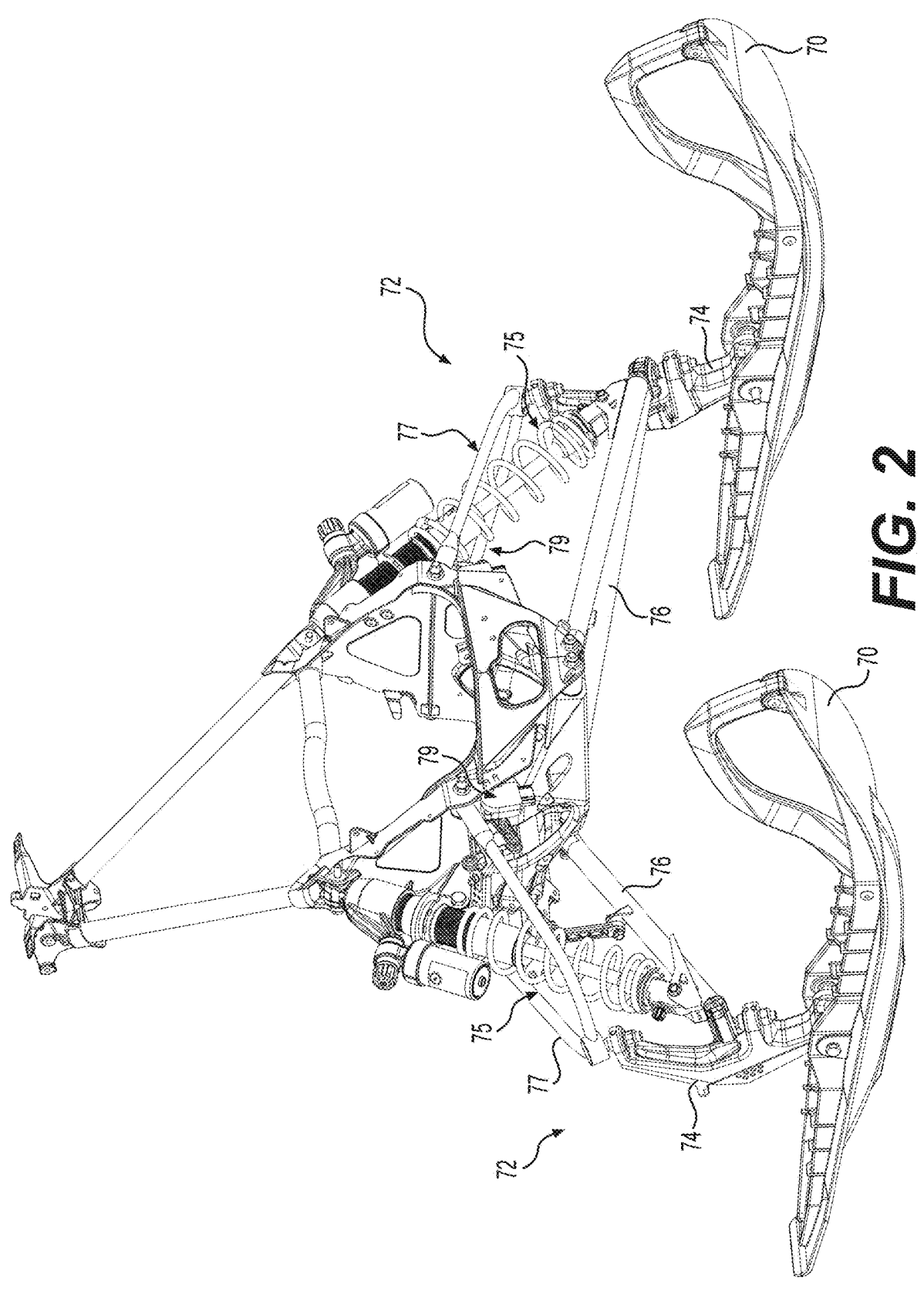
FIG. 2 is a front, right side perspective view of front suspension assemblies of the snowmobile of FIG. 1.
Figure 3:
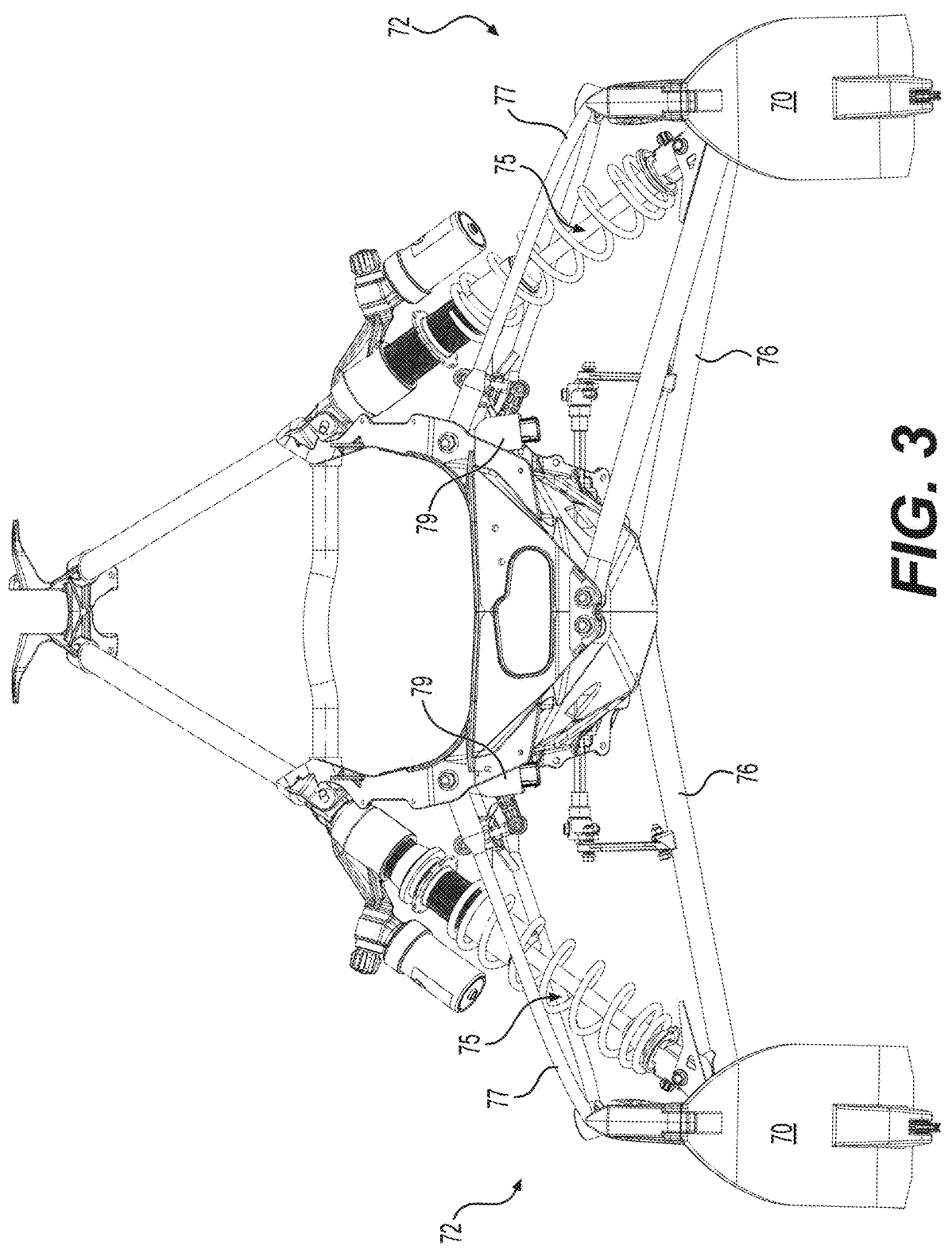
FIG. 3 is a front elevation view of the front suspension assemblies of FIG. 2.
Figure 4:
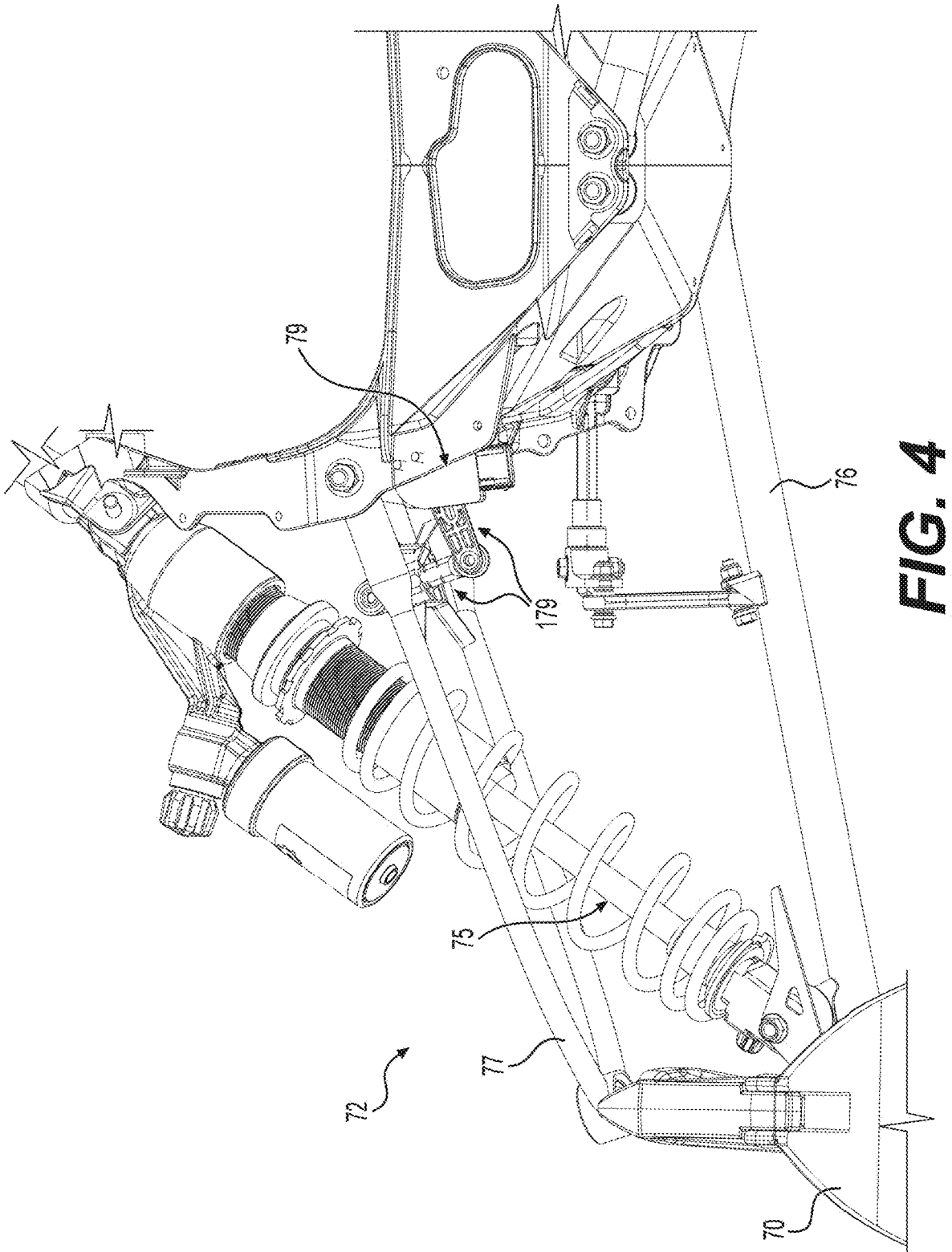
FIG. 4 is a close-up view of a right one of the front suspension assemblies in FIG. 3.
Figure 5:
FIG. 5 is a left side elevation view of a tunnel and a rear suspension assembly of the snowmobile of FIG. 1.
Figure 6:
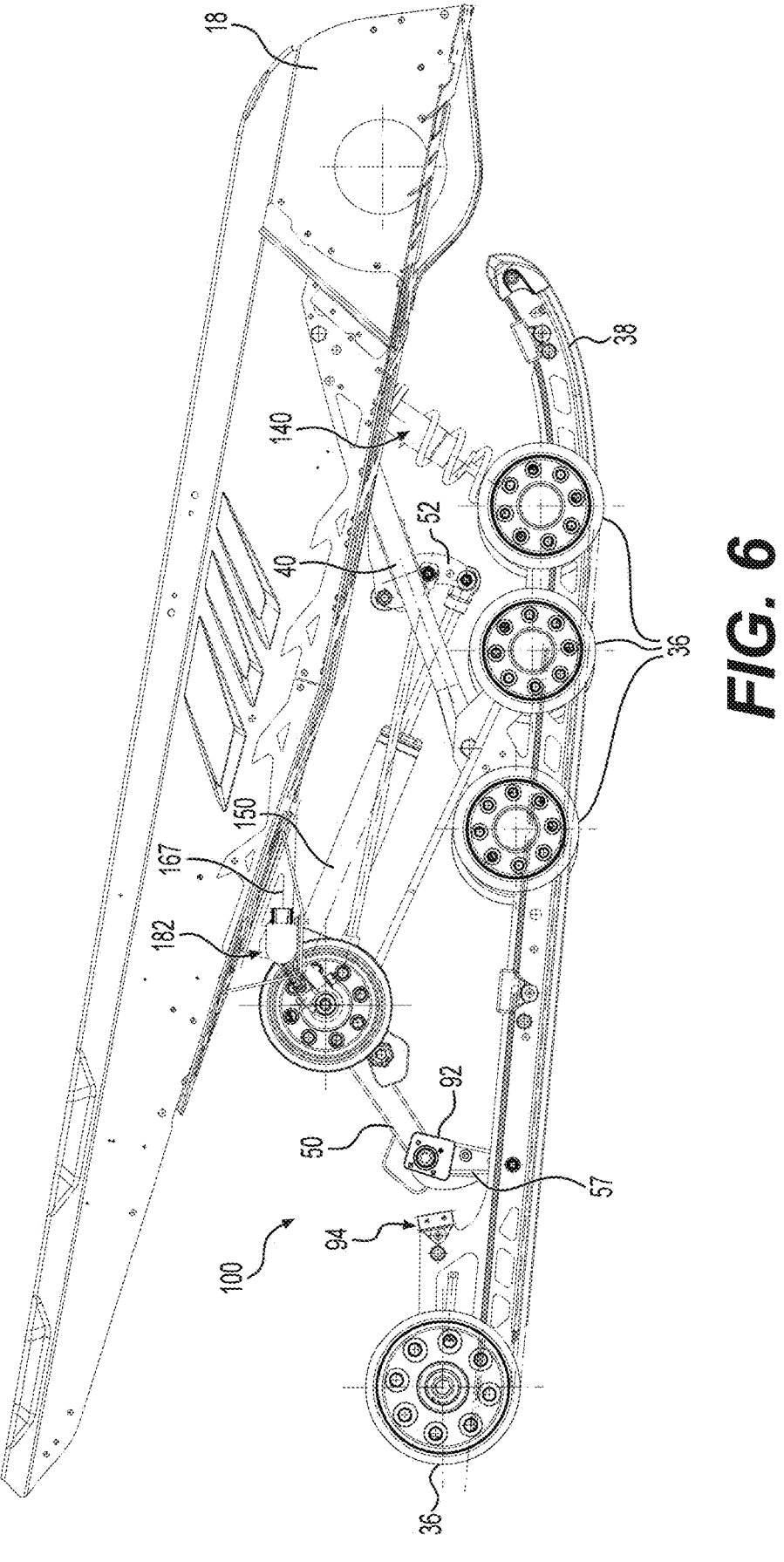
FIG. 6 is a right side elevation view of the tunnel and the rear suspension assembly of FIG. 5.
Figure 7:
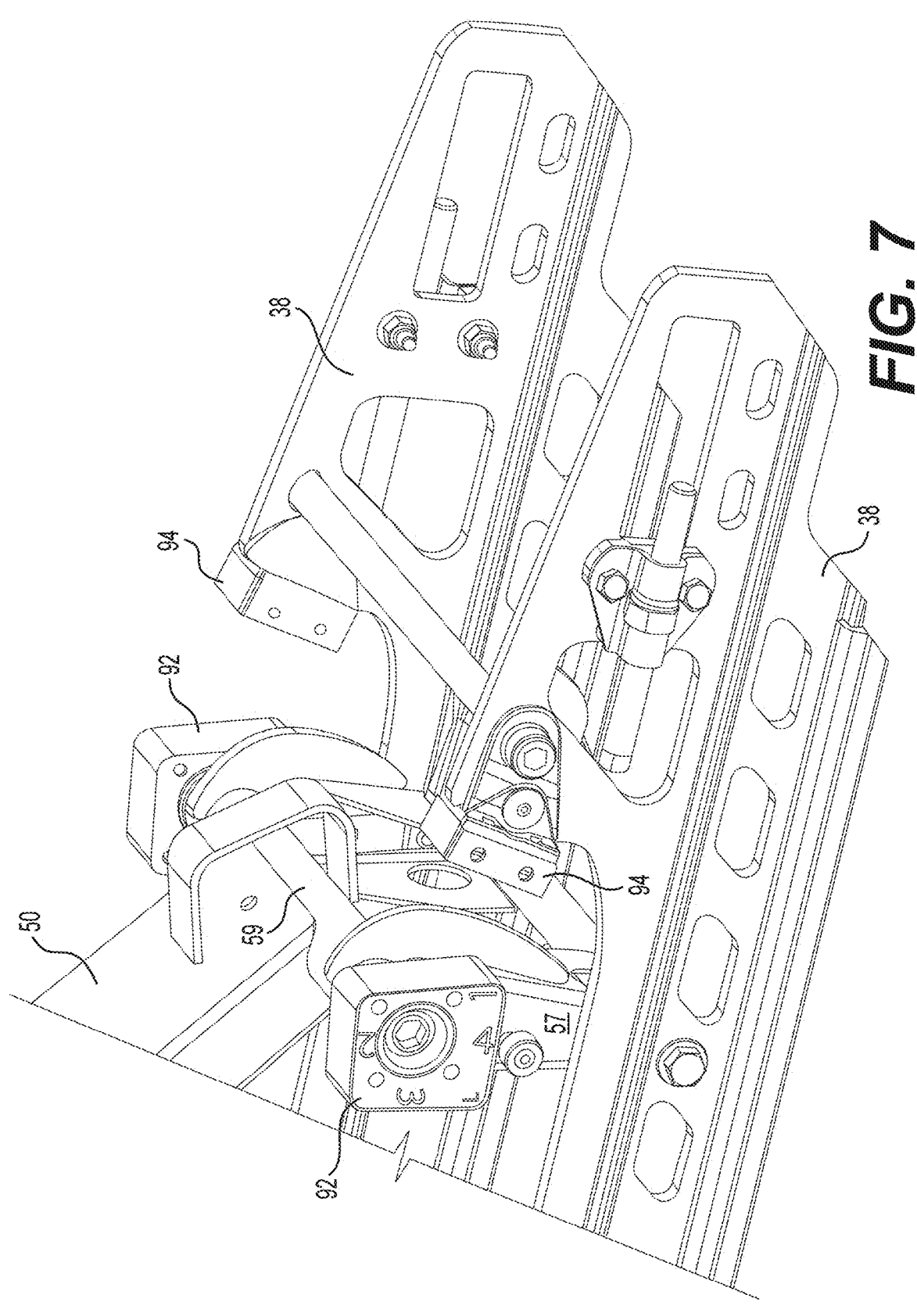
FIG. 7 is a close-up, top, rear, left side perspective view of a rear portion of the rear suspension assembly of FIG. 5.
Figure 8:
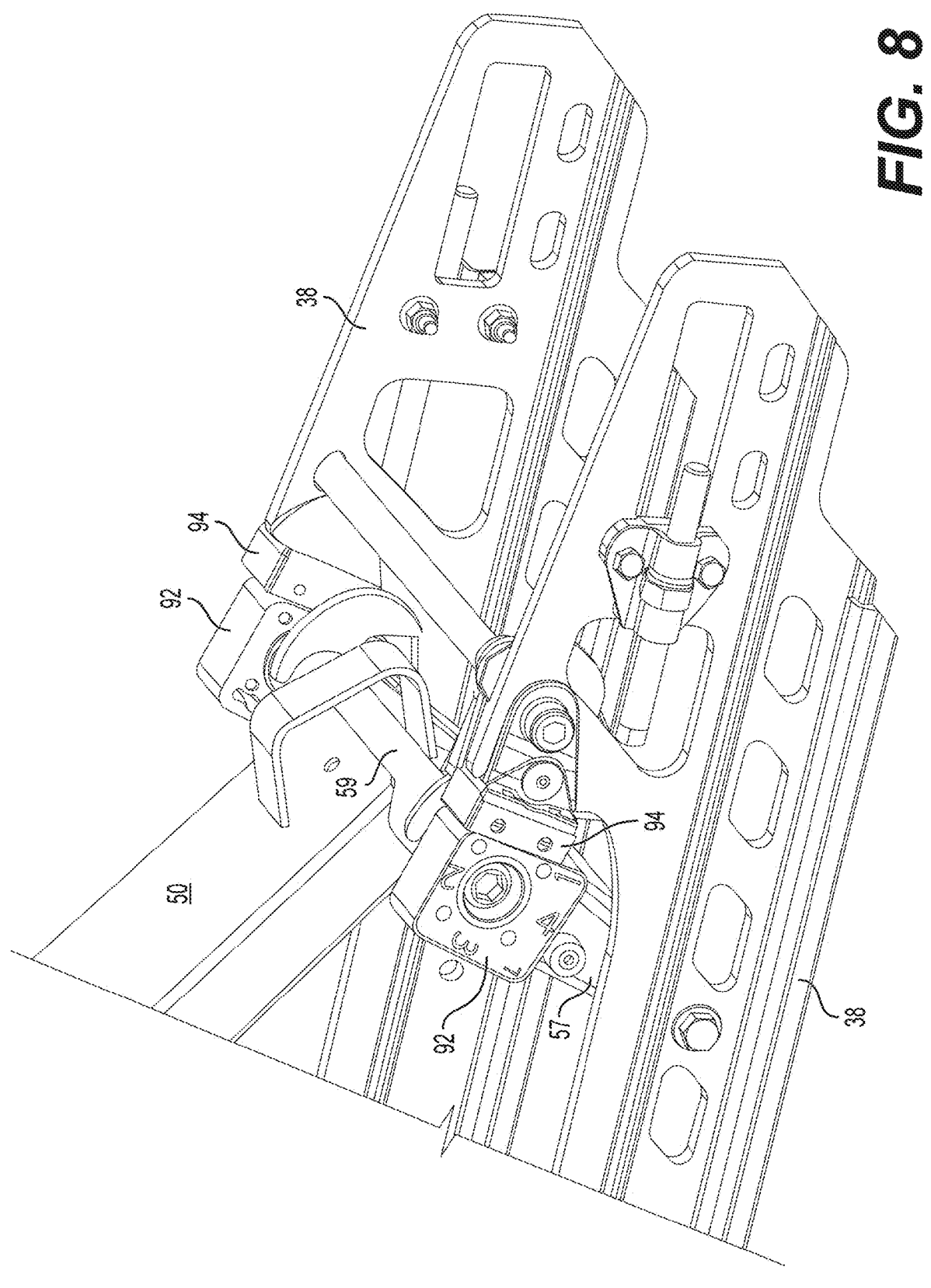
FIG. 8 is a close-up, top, rear, left side perspective view of the components of FIG. 7, with coupling blocks abutting corresponding rear stoppers.
Figure 9:
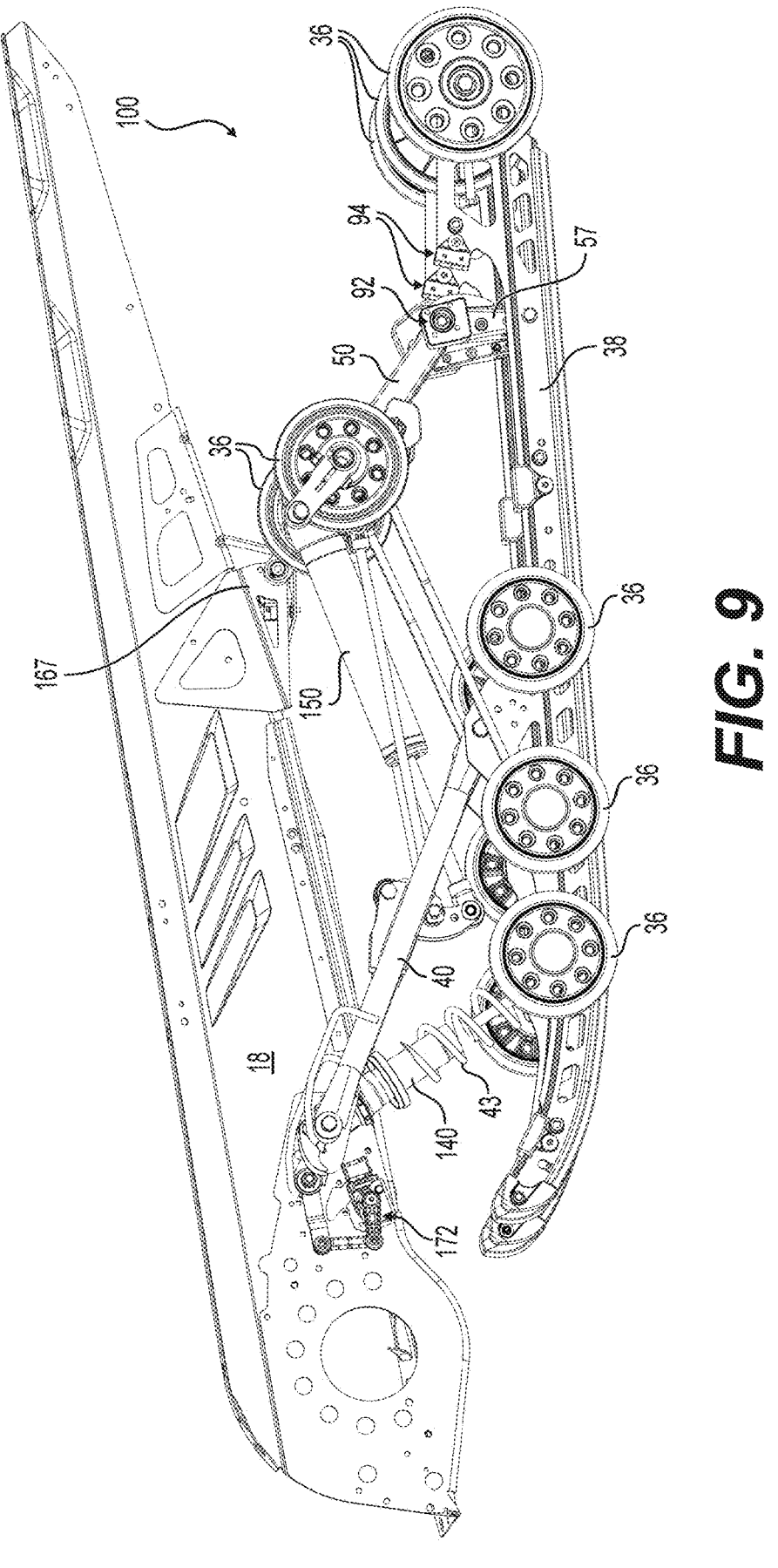
FIG. 9 is a front, left side perspective view of the tunnel and rear suspension assembly of FIG. 5, with left side portions of the tunnel having been removed.

With reference to FIGS. 2 to 4, portions of the front suspension assemblies 72 will now be discussed in more detail.

The two skis 70 are attached to the chassis 16 through the front suspension assemblies 72. Each front suspension assembly 72 includes a ski leg 74. A lower A-arm 76 and an upper A-arm 77 pivotably connect the ski leg 74 to the chassis 16. Each front suspension assembly 72 further includes a shock absorber 75 extending between the chassis 16 and the lower A-arm 76.

Each front suspension assembly 72 further includes a sensor 79 for sensing the position of the front suspension assembly 72 relative to the chassis 16. The sensor 79 is linked to the top A-arm 77 via two rigid linkages 179 (FIG. 4). As the two A-arms 76, 77 have a fixed separation, measurement of the displacement and the speed of displacement between the top A-arm 77 and the chassis 16 by the sensor 79 directly correlates to a stroke and a piston velocity of the corresponding shock absorber 75. The stroke of a shock absorber 75 describes a displacement of a piston of the shock absorber 75 with respect to the cylinder of the shock absorber 75 and provides a measurement of the extension or compression of the shock absorber 75. The piston velocity, throughout the present description, simply describes the rate at which the shock absorber 75 is extending or compressing.

The sensor 79 is communicatively and electronically connected to a controller 190. The controller 190 is part of an electronic control unit (ECU) of the snowmobile 10. It is contemplated, however, that the controller 190 could be a stand alone computer implemented system within the snowmobile 10 in some implementations. The controller 190 receives information from each sensor 79 for determining the stroke and piston velocity of the corresponding shock absorber 75.

The shock absorbers 75 of the front suspension assemblies 72 in the present technology have selectively variable damping. The shock absorbers 75 are communicatively and electronically connected to the controller 190, from which the shock absorbers 75 receive electronic signals to control the selectively variable damping. In the present implementation, the selectively variable damping of the shock absorbers 75 changes based on an electrical current received by the shock absorbers 75. Specifically, the shock absorber 75 includes an electronic solenoid valve (not shown) that controls the hydraulic fluid flow between different chambers of the shock absorber cylinder. This allows movement of the hydraulic fluid through more or less volume, thereby altering the damping characteristics of the shock absorber 75. It is contemplated that different forms of electronically controlled shock absorbers could be used, including for example, shock absorbers using magnetorheological damping fluid.

In the present technology, the selectively variable damping has an inverse relationship with the electric current received, such that the damping decreases with increasing currents applied to the shock absorbers 75. Control of the shock absorbers 75 will be described in more detail below. It is contemplated that the shock absorbers 75 could include selectively variable damping that is operative by another mechanism. In some implementations, it is also contemplated that the shock absorbers 75 may not include selectively variable damping.

With reference to FIGS. 5 to 13, portions of the rear suspension assembly 100 will now be discussed in more detail.

The rear suspension assembly 100 includes the front suspension arm 40 and the rear suspension arm 50 disposed rearward of the front suspension arm 40. The front and rear suspension arms 40, 50 extend forwardly and upwardly from the slide rails 38 and support the tunnel 18. The front and rear suspension arms 40, 50 are made of metal tubes. It is contemplated that the front and rear suspension arms 40, 50 could be of another material than metal.

Figure 10:
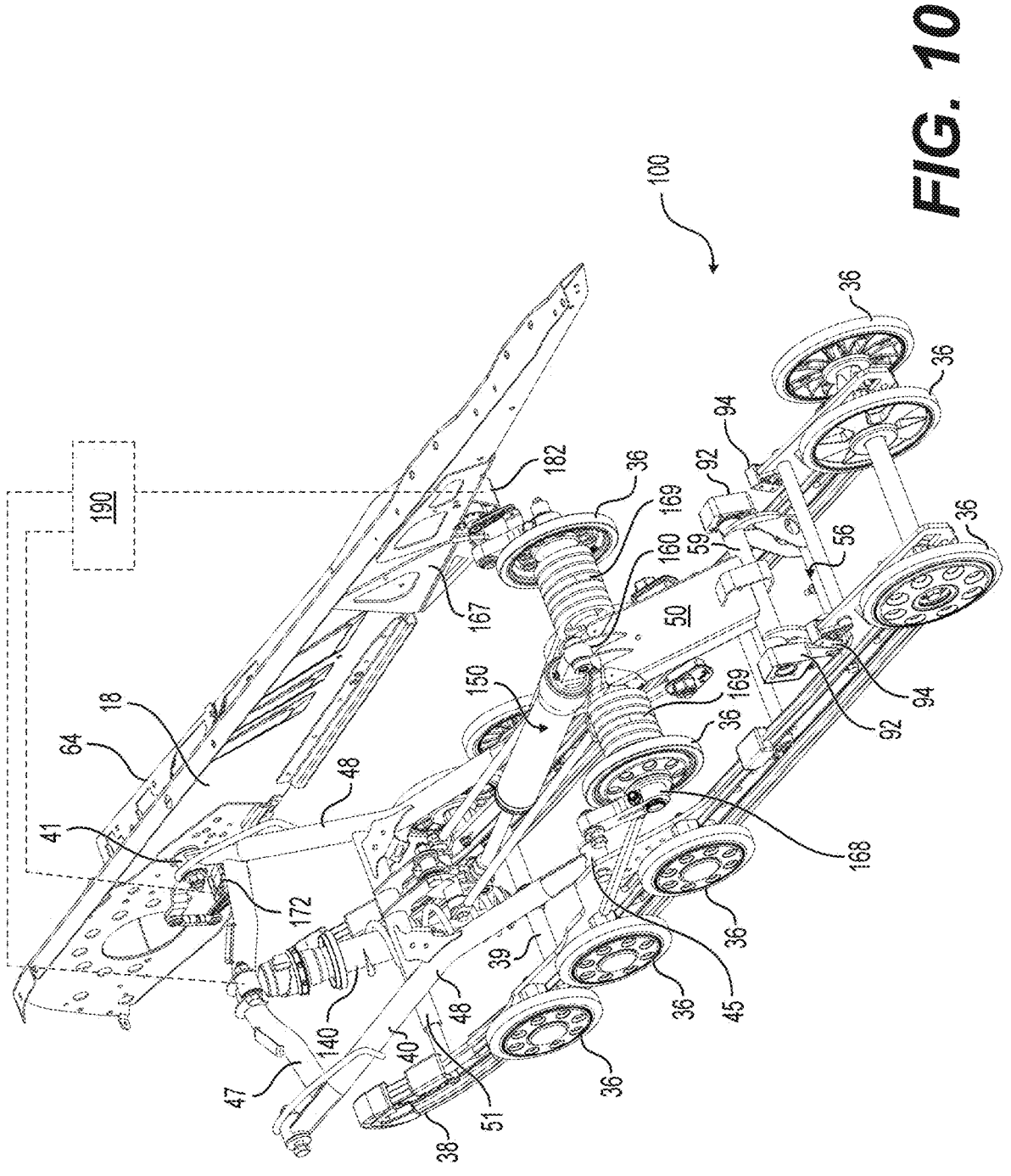
FIG. 10 is a top, rear, left side perspective view of the tunnel portion and rear suspension assembly of FIG. 9.

The front suspension arm 40 is pivotally connected to the tunnel 18 at an upper end 41. At a lower end 45, the front suspension arm 40 is pivotally connected to the slide rails 38. As shown in FIG. 10, the front suspension arm 40 has left and right members 48 interconnected near the upper end 41 by an upper bar 47, and near a midpoint of the left and right members 48 by a middle bar 51. The left and right members 48 are parallel to one another along a lower portion thereof and diverge away from one another at an upper portion thereof. The forward rear shock absorber 140 extends rearwardly and downwardly from the tunnel 18 to the slide rails 38. Specifically, the shock absorber 140 is pivotally connected to the upper bar 47 of the front suspension arm 40 and to a cross-bar 39 extending between the slide rails 38 (best seen in FIG. 10).

The shock absorber 140 is surrounded by a coil spring 43, as is illustrated in the Figures, although it is contemplated that the coil spring 43 could be omitted in some implementations. The shock absorber 140 has a selectively variable damping, as will be described in detail below. The shock absorber 140 is communicatively connected to the controller 190, illustrated schematically in FIG. 10. In some implementations, it is contemplated that the rear suspension assembly 100 could include a different controller than the controller 190 connected to the front suspension assemblies 72.

Figure 13:
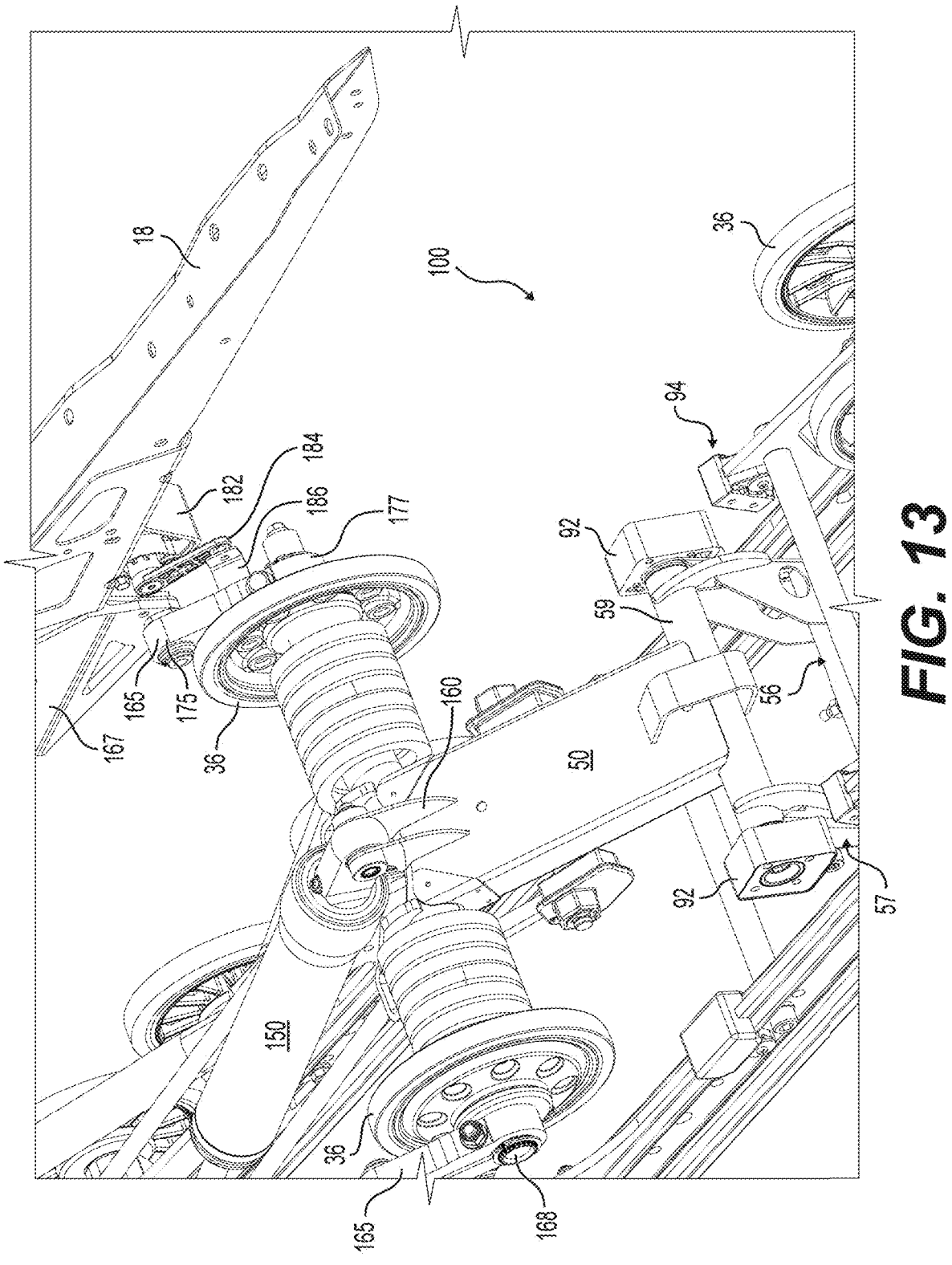
FIG. 13 is another close-up, partial view of a portion the tunnel portion and rear suspension assembly of FIG. 10.

The rear suspension arm 50 is rotatably connected at an upper end to a shaft 168. The shaft 168 is mounted to the tunnel 18 via rigid members 165 pivotably connected to left and right brackets 167. Notably, as shown in FIG. 13, a distal end 175 of each rigid member 165 is pivotably connected to a corresponding one of the brackets 167, while a proximal end 177 of each rigid member 165 is pivotably connected to the shaft 168. The left and right brackets 167 are fastened to the left and right sides of the tunnel 18 respectively. A lower end of the rear suspension arm 50 is fixedly connected to a hollow shaft 59.

The rear suspension assembly 100 further includes a left rocker arm 57 and a right rocker arm 57. Upper ends of the left and right rocker arms 57 are pivotally connected to a shaft (not shown) extending through the hollow shaft 59. The shaft rotates within the hollow shaft 59, such that the rocker arms 57 can rotate with respect to the lower end of the rear suspension arm 50. Each of the left and right rear rocker arms 57 is fixedly connected at its lower end to a tube 56. Inside the tube 56 is a shaft (not shown) connected between rear portions of the slide rails 38. The tube 56 rotates about the shaft, allowing the rocker arms 57 to rotate with respect to the slide rails 38. It is contemplated that the rocker arms 57 could be omitted and that the rear suspension arm 50 could be pivotably connected directly to the slide rails 38.

Figure 11:
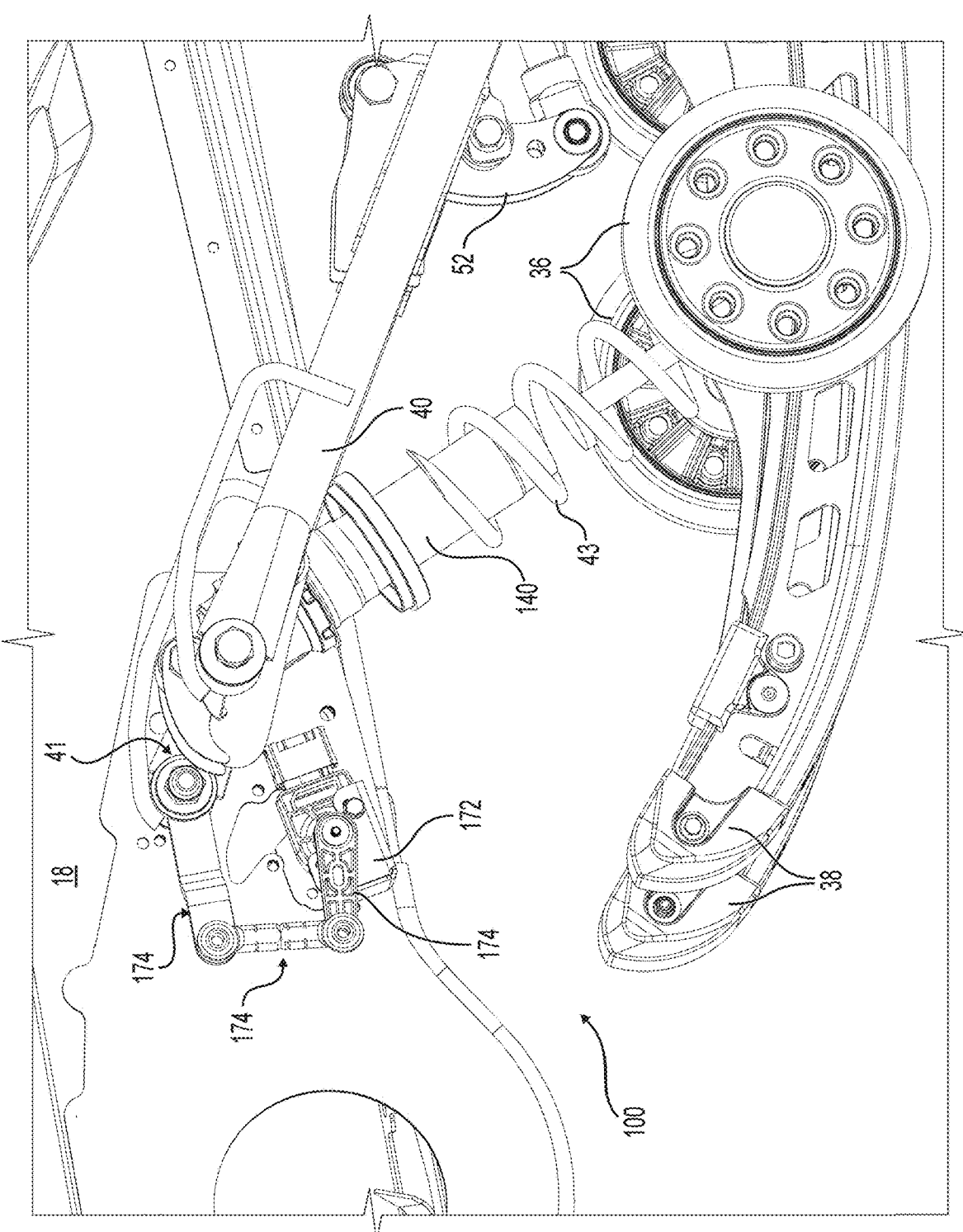
FIG. 11 is a close-up, partial view of a portion of the tunnel portion and rear suspension assembly of FIG. 9.

The rearward rear shock absorber 150 extends forwardly and downwardly from the tunnel 18, and is disposed at least in part rearwardly of the front suspension arm 40. More specifically, the shock absorber 150 is pivotably connected at its upper end to a rear bracket 160 connected to a top end of the rear suspension arm 50. A lower end of the shock absorber 150 is pivotably connected to the front suspension arm 40 via brackets 52 (FIG. 11). It is contemplated that the shock absorber 150 could be connected between the rear suspension arm 50 and the pair of rails 38 in some implementations. As will be described in more detail below, in some embodiments, the shock absorber 150 has selectively variable damping.

Left and right torsion springs 169 are provided in order to push the slide rails 38 away from the tunnel 18, and to maintain the shock absorbers 140, 150 substantially extended when no substantial loads are applied thereon. The left and right torsion springs 169 are disposed around the shaft 168. It is contemplated that only one torsion spring 169 could be used.

Further details for suspension arms and shock absorber assemblies similar to the suspension arms 40, 50 and the shock absorbers 140, 150 can be found in U.S. Pat. No. 9,114,852, issued Aug. 25, 2015, the entirety of which is incorporated herein by reference.

The pivoting of the suspension arms 40, 50 changes the relative angle and vertical separation between the slide rails 38 and the tunnel 18 to enable bump absorption as the snowmobile 10 travels over uneven or rough terrain. In the configuration of the arms 40, 50 and shock absorbers 140, 150 described above, the rear suspension assembly 100 has the kinematic properties of a five-bar mechanism, generally referred to as an uncoupled rear suspension assembly. The movement of the front and rear portions of the slide rails 38 is generally uncoupled, such that the front suspension arm 40 and the front shock absorber 140 can react independently from the rear suspension arm 50 and the rear shock absorber 150. Movement of the front portions of the slide rails 38 relative to the tunnel 18 causes the front suspension arm 40 to rotate relative to the tunnel 18 (but not necessarily the rear suspension arm 50). Likewise, movement of the rear portions of the slide rails 38 relative to the tunnel 18 causes the rear suspension arm 50 and the rocker arms 57 to rotate relative to the tunnel 18. This uncoupled motion allows the slide rails 38, and the endless track 30, to pass up and over smaller obstacles without needing to compress the whole rear suspension assembly 100.

When the snowmobile 10 encounters a more substantial obstacle, however, it may be desirable to have all of the rear suspension assembly 100 absorb the disturbance. This is achieved by coupling the otherwise independent front and rear suspension arms 40, 50 and their accompanying shock absorbers 140, 150. When coupled, the slide rails 38 maintain substantially the same orientation relative to the tunnel 18 while rising over the bump. When the front portions of the slide rails 38, for example, rise over a bump independently of the rear portions, an angular acceleration on the rider is created which is generally more uncomfortable than a merely vertical acceleration. In the coupled configuration, the suspension assembly 100 has the kinematic properties of a four-bar mechanism.

With reference to FIGS. 7 to 10, the coupled configuration of the rear suspension assembly 100 is accomplished through the use of one or more coupling blocks 92 connected to the rear suspension arm 50 and the rocker arms 57 in cooperation with one or more corresponding rear stoppers 94 connected to one or both of the slide rails 38. In the present implementation, the snowmobile 10 includes two coupling blocks 92 and two rear stoppers 94. It is contemplated that the snowmobile 10 could include only one coupling block 92 and one rear stopper 94 in some implementations.

In standard operation, the rear suspension arm 50 and the rocker arms 57 rotate generally independently from the front suspension arm 40. When encountering a sufficiently large bump, the rocker arms 57 rotate clockwise (as seen from the left side of the snowmobile 10) until the coupling blocks 92 abut the rear stoppers 94. The rear stoppers 94 impede further clockwise movement of the rocker arms 57, thus eliminating one degree of freedom from the rear suspension assembly 100, thereby converting the five-bar mechanism to the four-bar mechanism. The four-bar mechanism thus couples movement of the front and rear suspension arms 40, 50.

Further details for coupling arrangements in suspension assemblies similar to the coupling blocks 92 and the rear stoppers 94 can be found in U.S. Pat. No. 6,206,124, issued Mar. 27, 2001, the entirety of which is incorporated herein by reference.

According to the present technology, as can be seen in FIGS. 10 and 11, the rear suspension assembly 100 further includes two sensors 172, 182 which sense the position and movement of the two suspension arms 40, 50 in order to determine the stroke and piston velocity of the rear shock absorbers 140, 150. As is described above, the sensors 79 of the front suspension assemblies 72 are able to directly measure the piston movement for the shock absorbers 75 due to the fixed relationship between the A-arms 76, 77, and the corresponding shock absorber 75. In contrast, due to the uncoupled movement of the rear suspension assembly 100, the position of one of the suspension arms 40, 50 alone does not correspond directly to or definitively indicate the piston position or movement of its corresponding shock absorber 140, 150. By knowing the angular position and velocity of both of the suspension arms 40, 50, however, the stroke and piston velocity of each of the shock absorber 140, 150 can be calculated.

Figure 12:
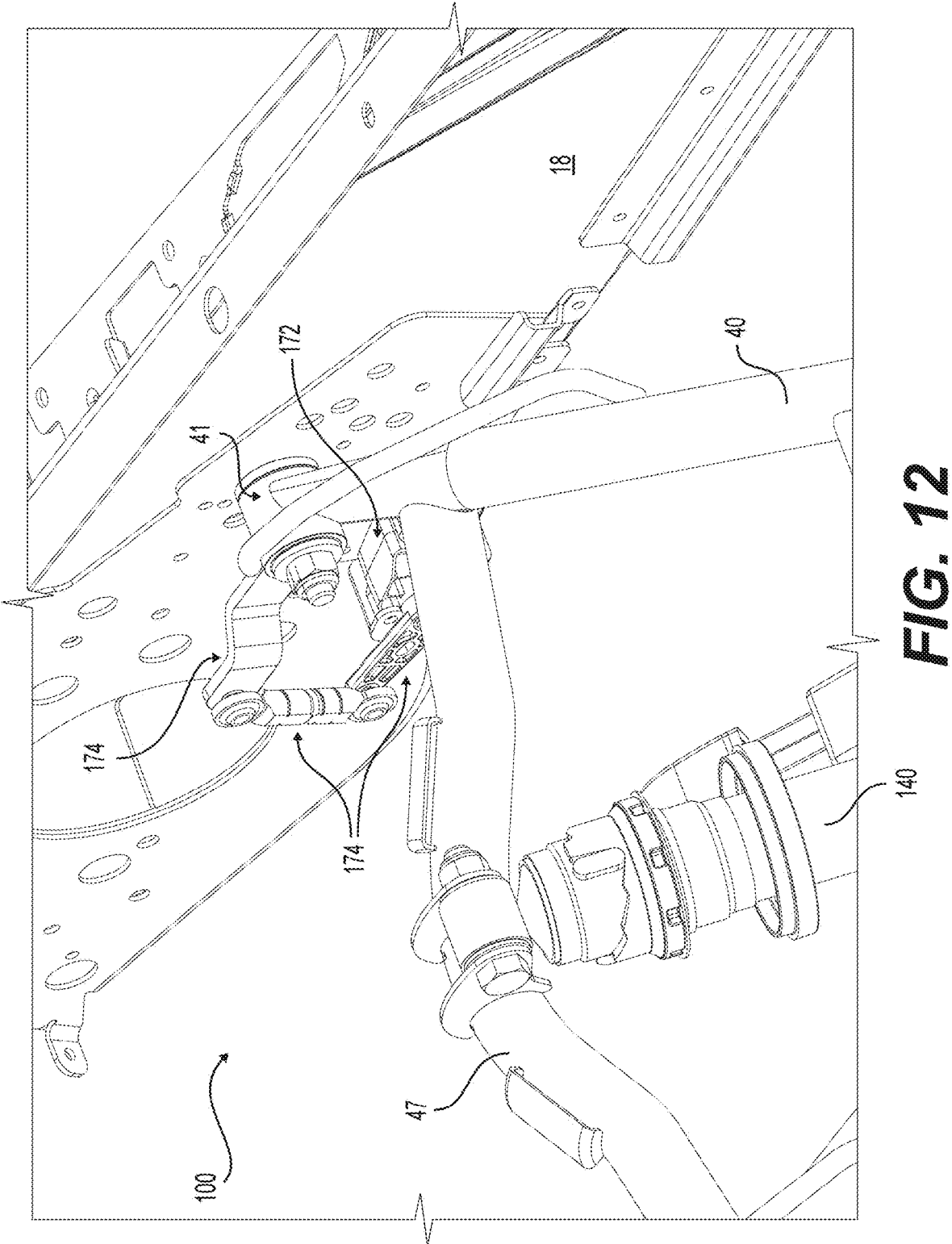
FIG. 12 is a close-up, partial view of a portion of the tunnel portion and rear suspension assembly of FIG. 10.

As shown in FIGS. 11 and 12, a sensor 172 for sensing the angular position of an upper end of the suspension arm 40 is fastened to an inside surface of the tunnel 18. The sensor 172 can further determine the angular velocity of the upper end of the suspension arm 40, based on changes in the angular position over a measured time. In some implementations, the controller 190 could determine the angular velocity based on angular position measurements from the sensor 172.

The sensor 172 is connected to the upper end 41 of the suspension arm 40. Specifically, the sensor 172 is connected to the upper end 41 of the arm 40 via three linkages 174, which are three rigid members 174 fastened together. It is contemplated that there could be more or fewer linkages 174. It is also contemplated that the sensor 172 could be differently connected to the suspension arm 40, depending on the particular implementation. The manner in which the sensor 172 is connected to the suspension arm 40 is not meant to be limiting.

For instance, an alternative embodiment of the rear suspension assembly 100 is illustrated in FIGS. 14 to 21, whereby the sensor 172 is connected to a different part of the suspension arm 40. More particularly, the sensor 172 (schematically illustrated in FIG. 14) is connected to the lower end 45 of the front suspension arm 40 and thus is configured to sense the angular position of the lower end 45 of the front suspension arm 40. In particular, as shown in FIGS. 15 to 18, the sensor 172 is connected to a sensor bracket 308 via threaded fasteners 307. Notably, the sensor 172 is enclosed within a sensor cover portion 321 of the sensor bracket 308. The sensor bracket 308 is in turn connected to the suspension arm 40 via threaded fasteners 309 extending through a wire housing portion 322 of the sensor bracket 308. As can be seen, in FIG. 15, the sensor 172 is positioned at the lower end 45 of the suspension arm 40 by the sensor bracket 308. A magnet 311 is also provided at the lower end 45 to produce a magnetic field that can be sensed by the sensor 172, notably since the sensor 172 is a Hall effect sensor in this embodiment and thus is configured to register the magnitude of the sensed magnetic field. More specifically, the magnet 311 is affixed to the inner end of a bushing 306 that partly extends through a right bore 49 of the lower end 45 of the suspension arm 40. A fastener 302 extending through a washer 304 and the right slide rail 38 engages the bushing 306 to connect the lower end 45 of the suspension arm 45 to the right slide rail 38. As the sensor 172 rotates with the suspension arm 40 via its connection to the sensor bracket 308, the magnitude of the magnetic field sensed by the sensor 172 changes since the bushing 306, and therefore the magnet 311, is stationary.

Figure 14:
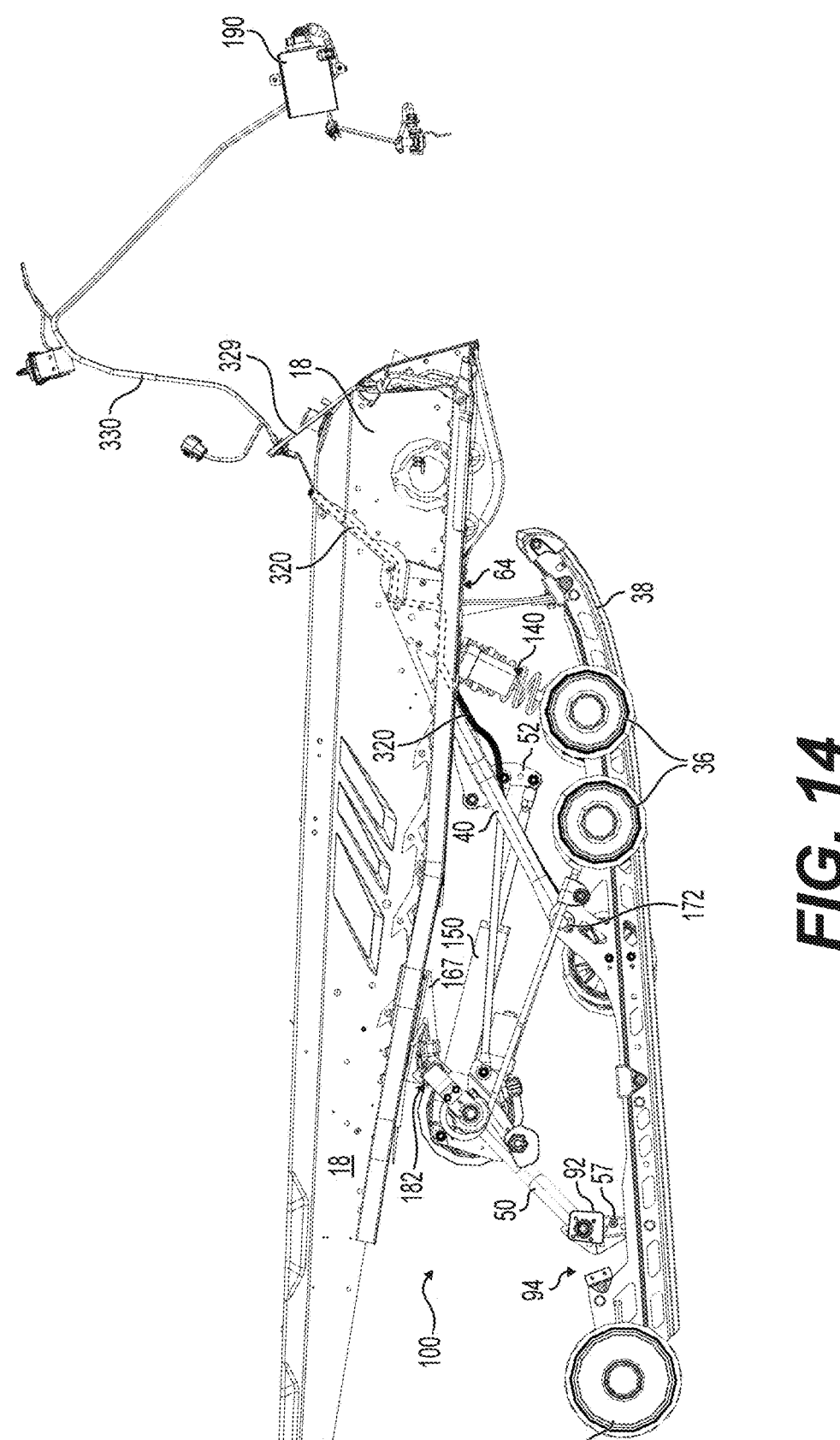
FIG. 14 is a right side elevation view of the tunnel, the rear suspension assembly and a wire harness according to another embodiment.
Figure 15:
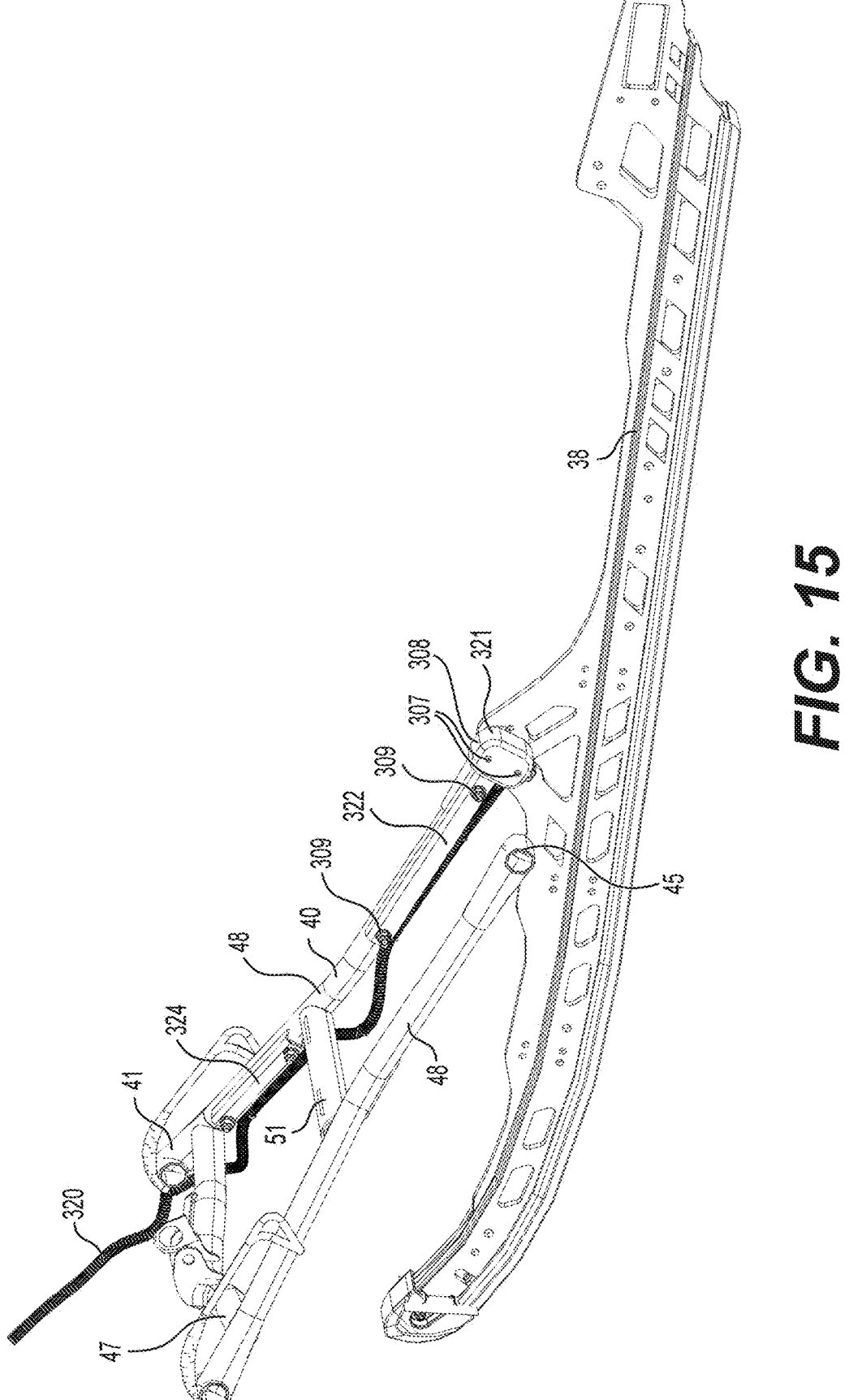
FIG. 15 is a rear, left side perspective view of part of the rear suspension assembly of FIG. 14, including a front suspension arm and a right slide rail thereof.
Figure 16:
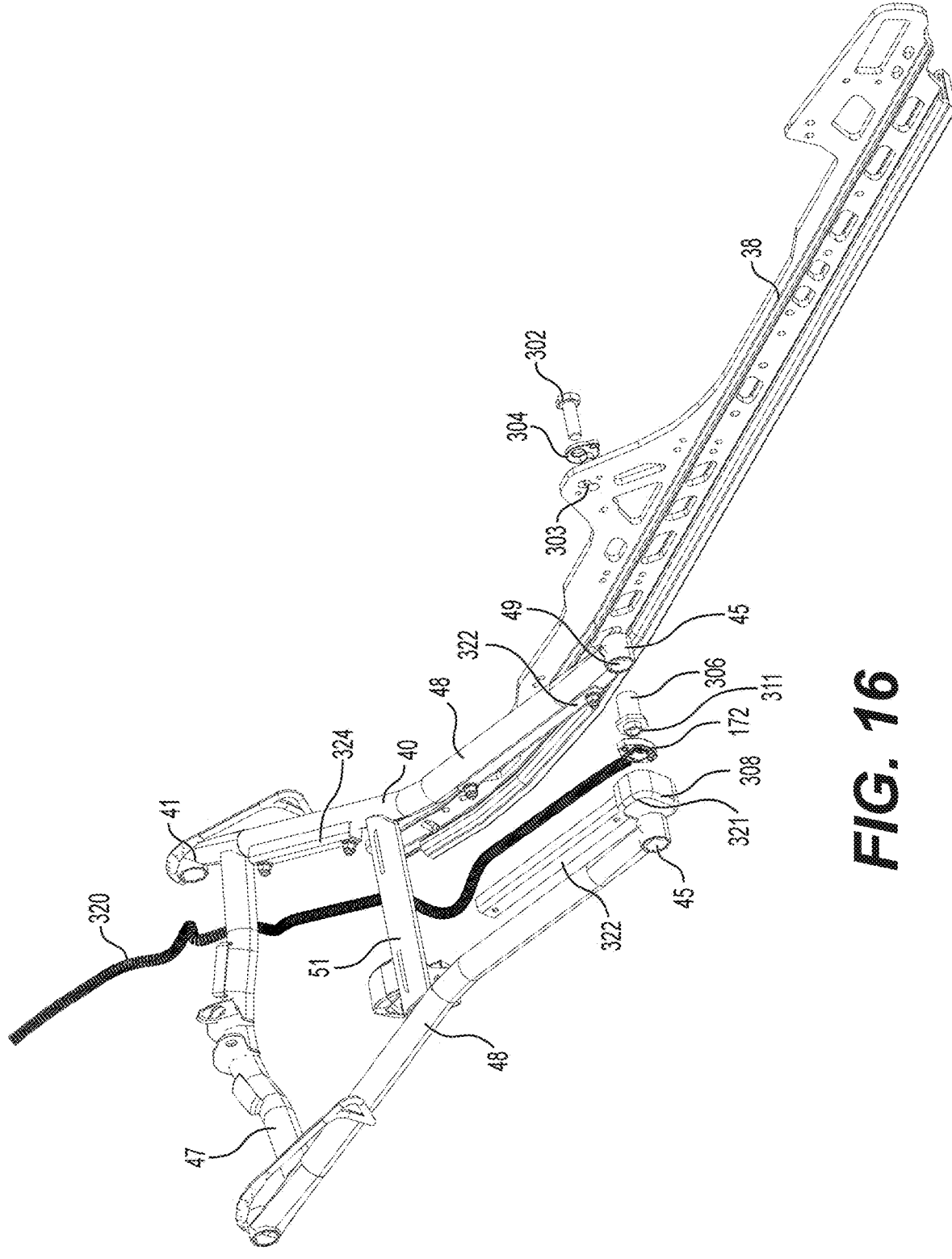
FIG. 16 is an exploded view, taken from a front, left side, of the part of the rear suspension assembly of FIG. 15.
Figure 17:
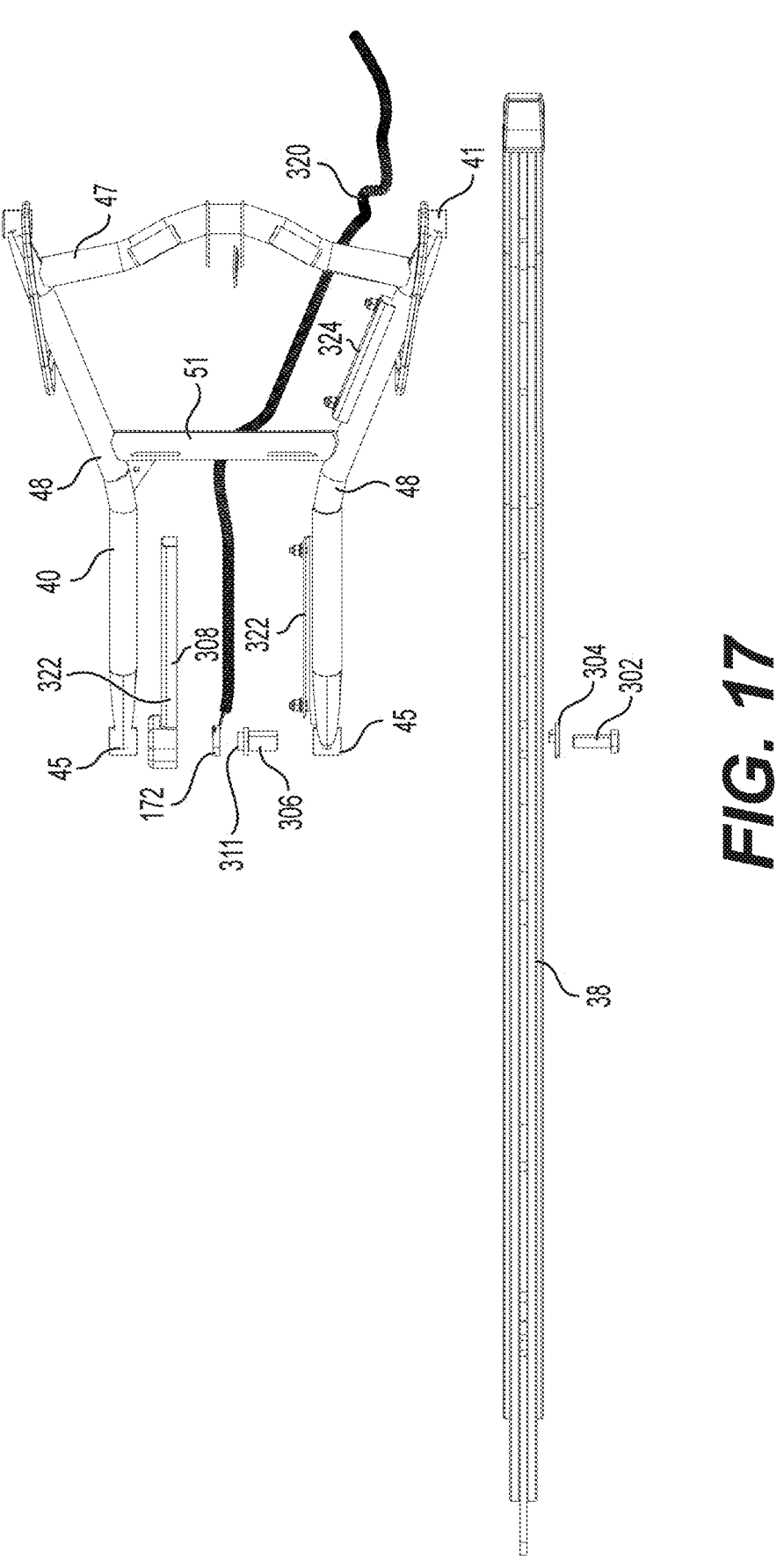
FIG. 17 is an exploded view, taken from a top, of the part of the rear suspension assembly of FIG. 15.
Figure 18:
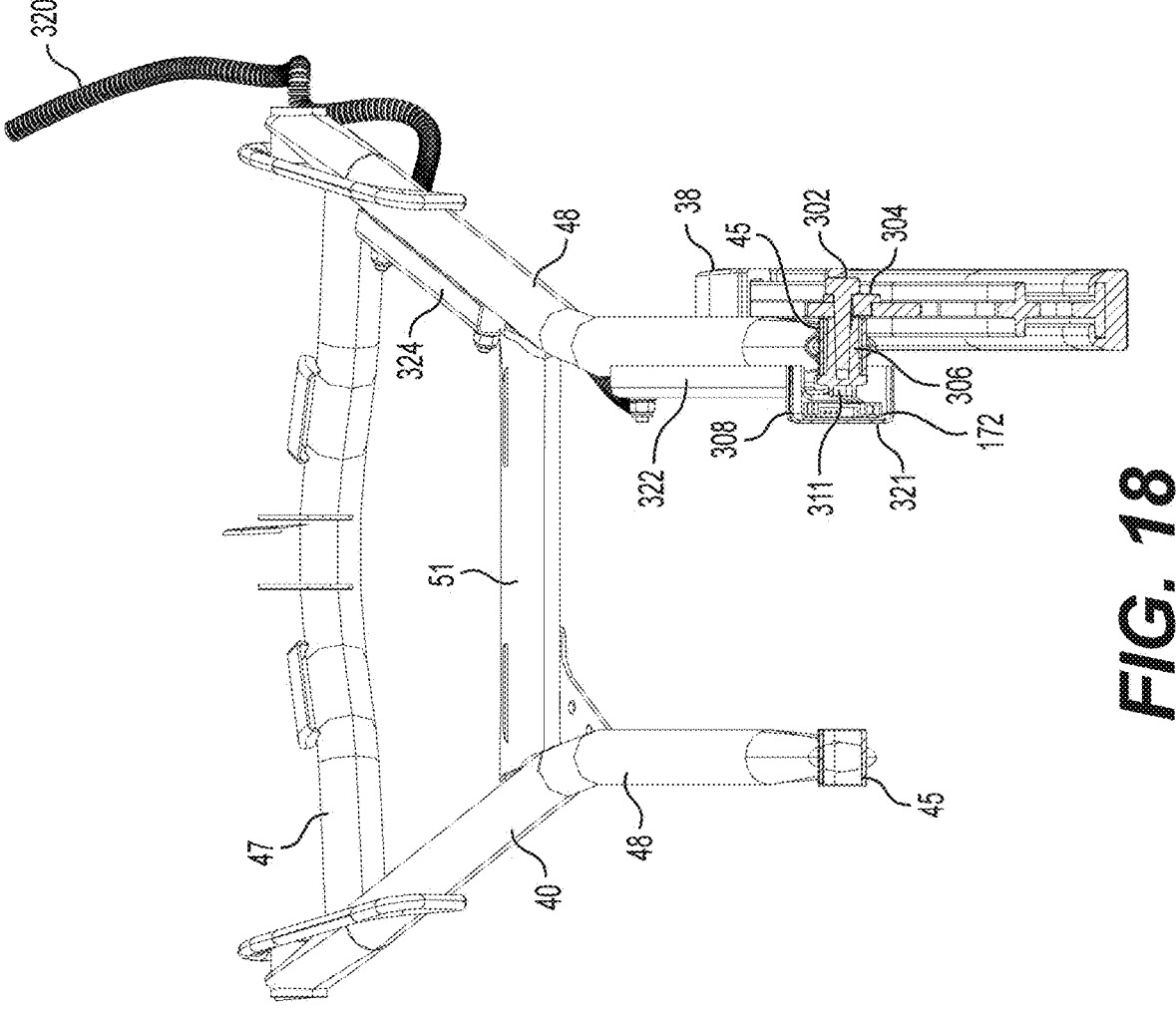
FIG. 18 is a cross-sectional view of the part of the rear suspension assembly of FIG. 15 taken along a plane extending through a sensor connected a lower end of the front suspension arm.
Figure 19A:
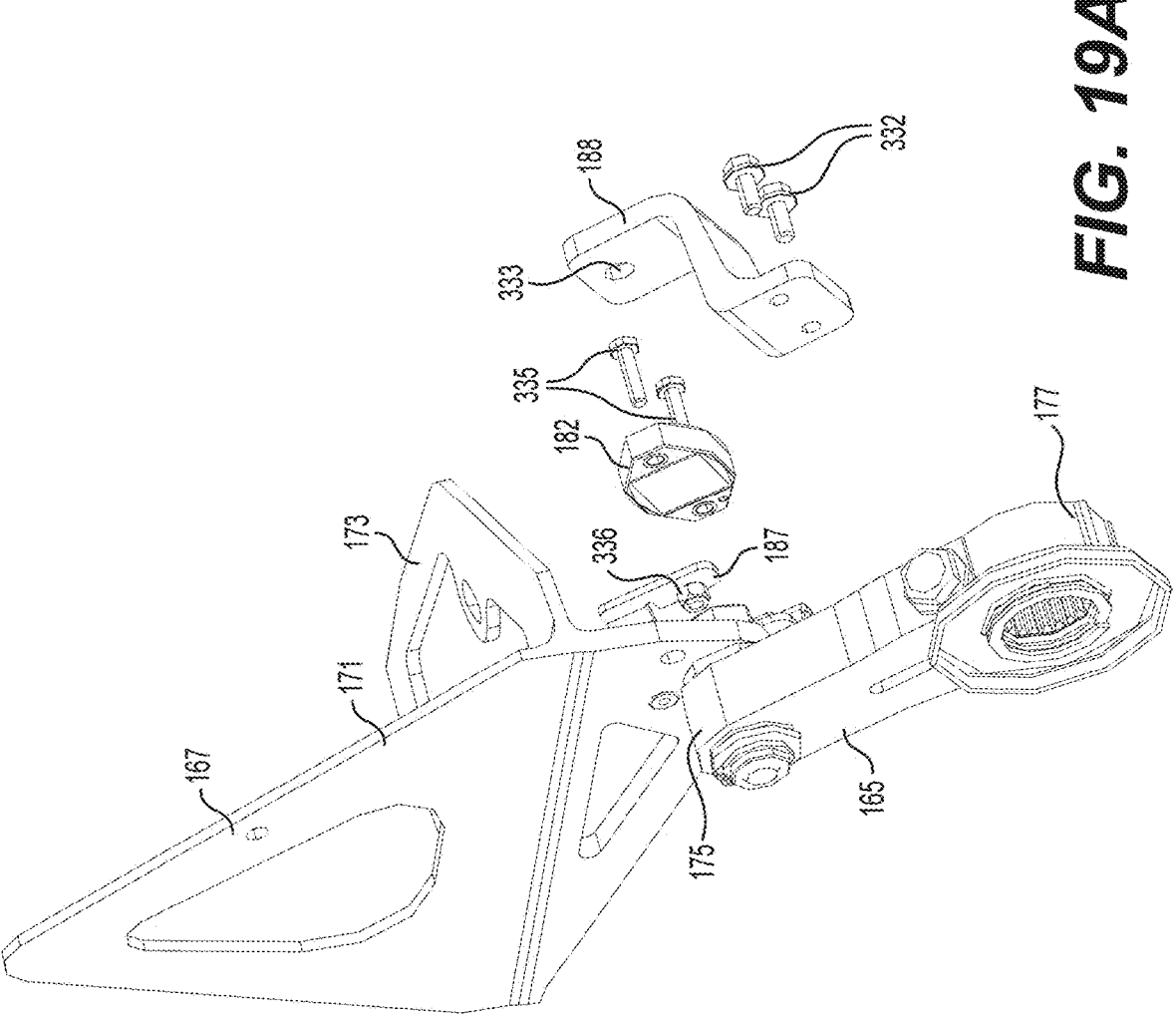
FIG. 19A is an exploded view, taken from a rear, left side, of part of the rear suspension assembly of FIG. 14, including a bracket, a rigid member and a sensor connected to a rear suspension arm of the rear suspension assembly.
Figure 19B:
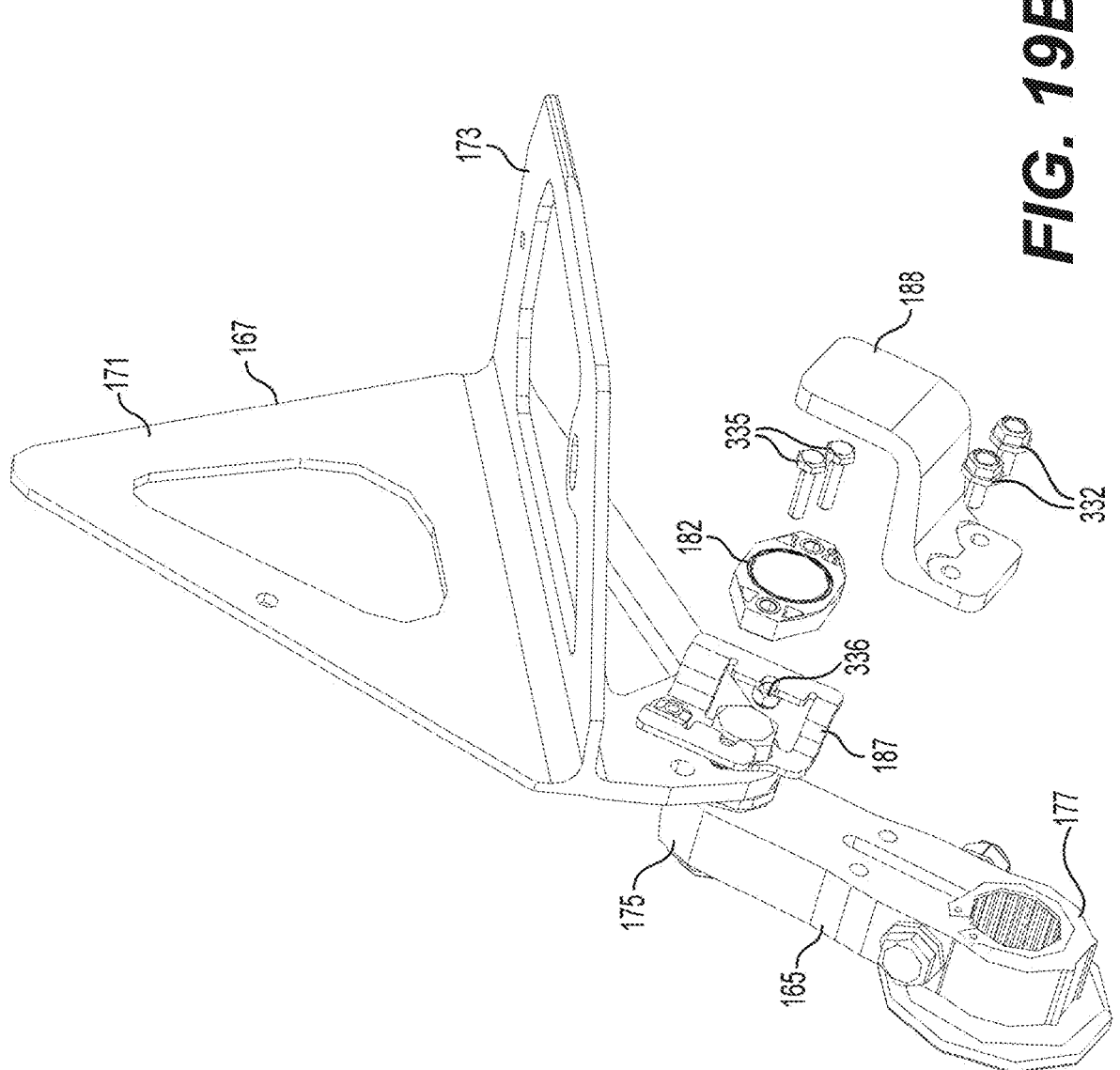
FIG. 19B is an exploded view, taken from a rear, right side, of the part of the rear assembly of FIG. 19A.

Furthermore, given the lower position of the sensor 172 in this alternative embodiment, a wire harness 320 interconnecting the sensor 172 to the controller 190 extends lower than in the embodiment in which the sensor 172 is connected to the upper end 41 of the front suspension arm 40. Notably, as can be seen in FIG. 15, the wire harness 320 extends from the lower end 45 of the suspension arm 40 upwards along the right member 48 of the suspension arm 40. In particular, part of the wire harness 320 is enclosed within the wire housing portion 322 of the sensor bracket 308 at the lower portion of the front suspension arm 40. At an upper portion of the front suspension arm 40, part of the wire harness is enclosed within an upper wire housing 324 which is fastened to the upper portion of the right member 48. As such, from the lower end 45 of the front suspension arm 40, the wire harness 320 extends upwardly and forwardly until around the middle bar 51 and then upwardly, forwardly and rightwardly towards the upper end 41 of the front suspension arm 40. From there, as shown in FIG. 14, the wire harness 320 is merged with another wire harness 329 (which will be described further below) into a combined wire harness 330 which extends upwardly and frontwardly to the controller 190.

Therefore, as can be seen from this alternative embodiment, the sensor 172 can be attached to different locations of the front suspension arm 40 to sense the angular position thereof.

Returning now to the previous embodiment, as shown in FIG. 13, a sensor 182 for sensing an angular position of an upper end of the rear suspension arm 50 is also fastened to the tunnel 18, generally rearward of the sensor 172. The sensor 182 can further determine the angular velocity of the upper end of the rear suspension arm 50, based on changes in the angular position over a measured time. In some implementations, the controller 190 could determine the angular velocity based on angular position measurements from the sensor 182.

The sensor 182 is connected to the upper end of the suspension arm 50 via the rigid member 165 extending from the shaft 168. Specifically, the sensor 182 is connected to a linkage 184, which in turn is connected to a bracket 186 fastened to the right rigid member 165, as is most clearly seen in FIG. 13. It is contemplated that there could be more linkages 165. As with sensor 172, the manner in which the sensor 182 is connected to the suspension arm 50 is not meant to be limiting. Notably, as will be described below with reference to the embodiment of FIGS. 14 to 21, the sensor 182 can be connected to the rear suspension arm 50 in a different manner. It is also contemplated that the sensor 182 could be connected directly to the suspension arm 50 in some implementations.

While in this embodiment the sensors 172, 182 are fastened to a right side of the tunnel 18, it is contemplated that one or both of the sensors 172, 182 could be fastened to the left side of the tunnel 18. It is also contemplated that the sensors 172, 182 could be connected to an underside of the central portion of the tunnel 18.

As mentioned above, in the alternative embodiment of FIGS. 14 to 21, the sensor 182 is connected to the rear suspension arm 50 differently. For instance, with particular reference to FIGS. 19A and 19B, in this alternative embodiment, the sensor 182 is connected to a sensor bracket 187 via bolts 335 which are securely received by nuts 336. In turn, the sensor bracket 187 is fastened to a vertical portion 171 of the right bracket 167 which, as discussed above, is fastened to the right side of the tunnel 18. A horizontal portion 173 of the right bracket 167 is connected to an underside of the right footrest 64. A magnet 333 is also provided to produce a magnetic field that can be sensed by the sensor 182, notably since the sensor 182 is a Hall effect sensor in this embodiment and thus is configured to register the magnitude of the sensed magnetic field. More specifically, the magnet 333 is affixed to an adapter 188 and faces the sensor 182. The adapter 188 is fixedly connected to the rigid member 165 via fasteners 332 such that the adapter 188, and thus the magnet 333, rotates together with the rigid member 165. Therefore, as the magnet 333 rotates together with the rigid member 165 (via the adapter 188) when the angular position of the rear suspension arm 50 changes, the magnitude of the magnetic field sensed by the sensor 182 changes since the sensor 182 is stationarily held onto the tunnel 18 (via the sensor bracket 186 and the bracket 187).

Figure 20:
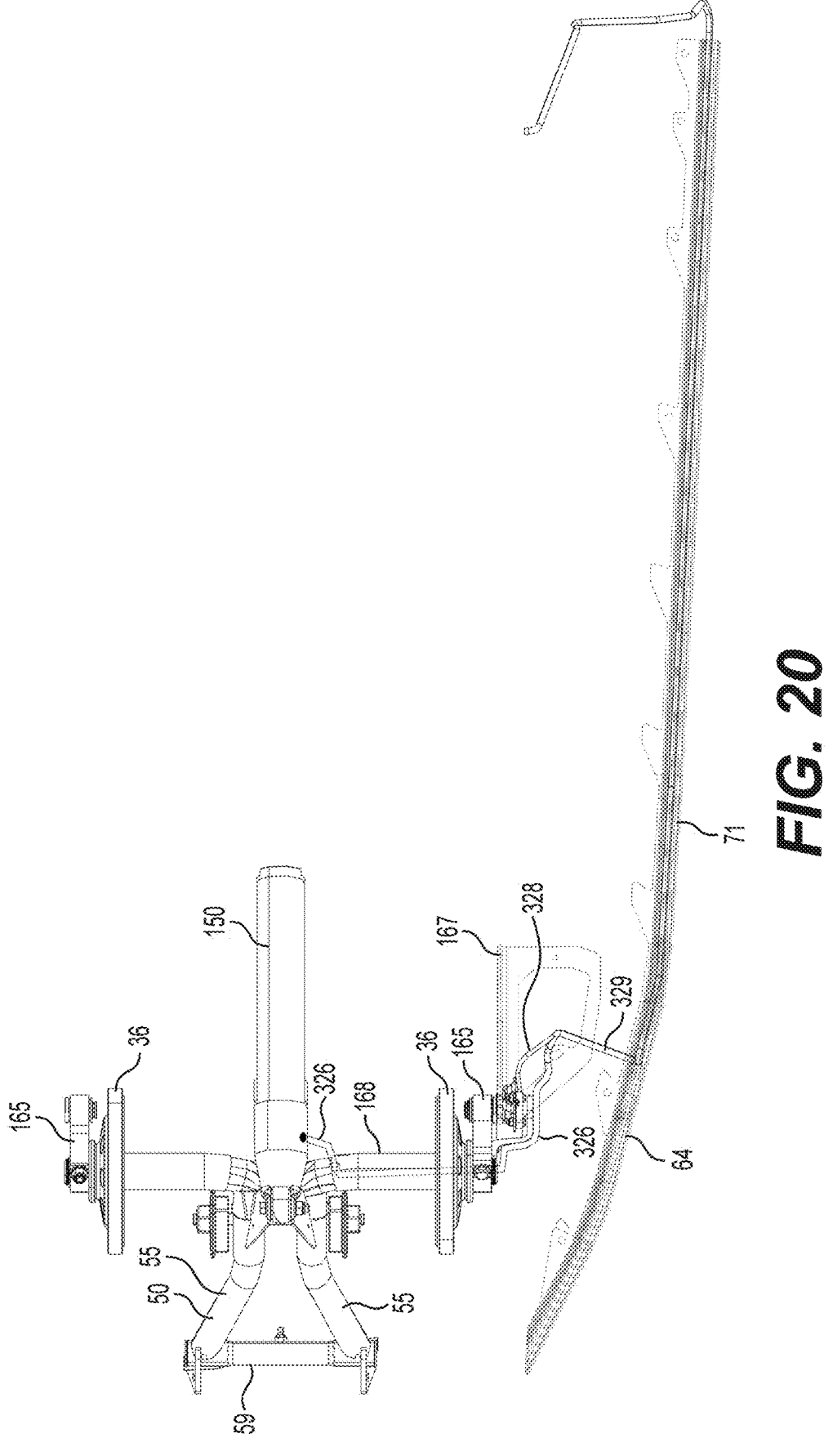
FIG. 20 is a top plan view of part of the rear suspension assembly of FIG. 15 and part of a right footrest of the snowmobile.

Furthermore, as best seen in FIG. 20, in this alternative embodiment, the rear suspension arm 50 is configured differently. Notably, in this alternative embodiment, the rear suspension arm 50 includes a left tubular arm member 55 and a right tubular arm member 55 which are identical to one another and are joined together by the shaft 59 at their lower ends. At their upper ends, the left and right arm members 55 are connected to left and right tubular upper arm members 61 of the rear suspension arm 50 which form in part the shaft 168 that connects the rear suspension arm 50 to the tunnel 18. In particular, the left, right and upper arm members 55, 61 are integrally made as a one-piece component. The ends of the upper arm members 61 are fitted with end shaft portions (not shown) to which the upper idler wheels 36 and the rigid members 165 are mounted (via a splined connection). Thus, in this alternative embodiment, the shaft 168 is formed by the left and right upper arm members 61 and the end shaft portions. Moreover, as can be seen in FIG. 20, a wire 328 connected to the sensor 182 extends laterally and is bundled together with a wire 326 connected to the shock absorber 150. Notably, the wire 326 extends from the shock absorber 150 through the interior of the right upper arm member 61 and the right end shaft portion of the shaft 168 and laterally outwards therethrough. A wire harness 329 thus combines the wires 326, 328 and extends laterally to an edge portion 71 of the right footrest 64. The wire harness 329 extends on an underside of the edge portion 71 and forwardly along the edge portion 71 of the right footrest 64 until reaching a front end thereof and then extends laterally inwardly and upwardly. As shown in FIG. 14, the wire harness 329 then merges with the wire harness 320 to form the combined wire harness 330 which, as described above, extends upwardly and frontwardly to the controller 190.

Figure 27:
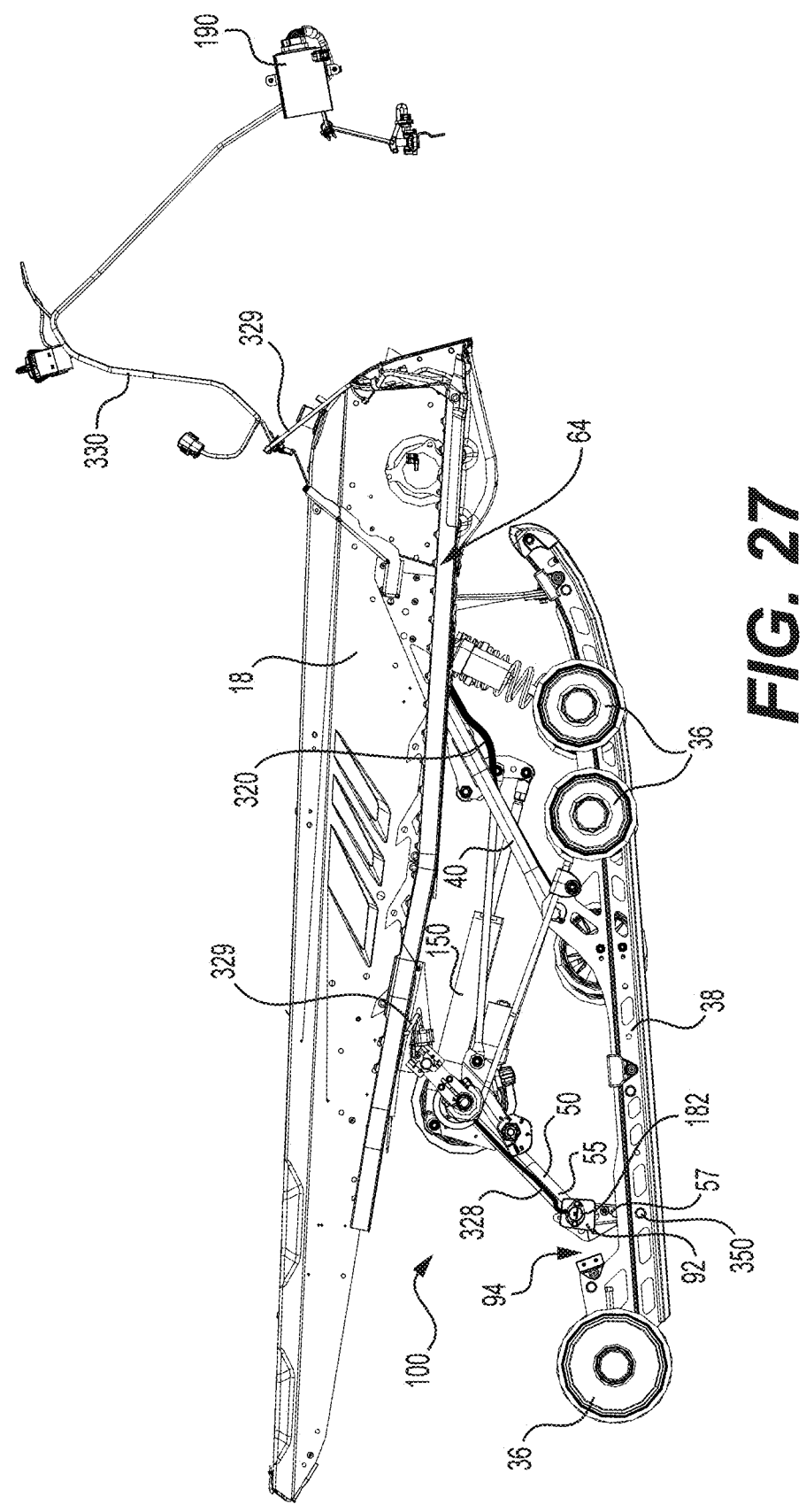
FIG. 27 is a right side elevation view of the tunnel, the rear suspension assembly and the wire harness according to another embodiment.

In yet other embodiments, the sensor 182 is configured to sense an angular position of the lower end of the rear suspension arm 50 rather than the upper end thereof. As such, the sensor 182 is positioned differently. For instance, with reference to FIG. 27, in this alternative embodiment, the sensor 182 is connected to the right rocker arm 57 (alternatively, it could be the left rocker arm 57). In particular, the sensor 182 is connected to the right coupling block 92 which is connected to the upper end of the right rocker arm 57. The sensor 182, which as discussed above is a Hall effect sensor, senses a magnetic field generated by a magnet (not shown) such as the magnet 333 that is connected to the lower end of the rear suspension arm 50 (e.g., the lower ends of the right arm member 55). The magnetic field sensed by the sensor 182 thus varies as the lower end of the rear suspension arm 50 moves relative to the sensor 182 such that the magnetic field sensed by the sensor 182 is indicative of the angular position of the lower end of the rear suspension arm 50 relative to the rocker arm 57. As can be seen, in such an embodiment, the wire 328 connected to the sensor 182 extends from the sensor 182 upwards along the rear suspension arm 50 to be bundled together with the wire 326 described above to form the harness 329.

In an alternative configuration (not shown), the sensor 182 could instead be connected to the lower end of the rear suspension arm 50 and the magnet could be connected to the rocker arm 57.

The sensor 182 could also be positioned differently to sense the angular position of the lower end of the rear suspension arm 50. For instance, with reference to FIG. 28, in this alternative embodiment, the sensor 182 is connected to the right slide rail 38 (alternatively, it could be the left slide rail 38) near a pivot (corresponding to 350 in FIG. 27), defined between right slide rail 38 and the right rocker arm 57. The sensor 182 senses a magnetic field generated by a magnet (not shown) such as the magnet 333 that is connected to the lower end of the rocker arm 57. The magnetic field sensed by the sensor 182 thus varies as the lower end of the rocker arm 57 moves relative to the sensor 182. As such, the magnetic field sensed by the sensor 182 is indicative of the angular position of the lower end of the rocker arm 57 relative to the slide rail 38. In turn, the angular position of the lower end of the rocker arm 57 can be used at least in part to determine the angular position of the lower of the rear suspension arm 50. As can be seen, in such an embodiment, the wire 328 connected to the sensor 182 extends from the sensor 182 forwardly along the right slide rail 38 and then upwardly along the front suspension arm 40 to be bundled together with the wire 326 described above to form the harness 329.

Figure 28:
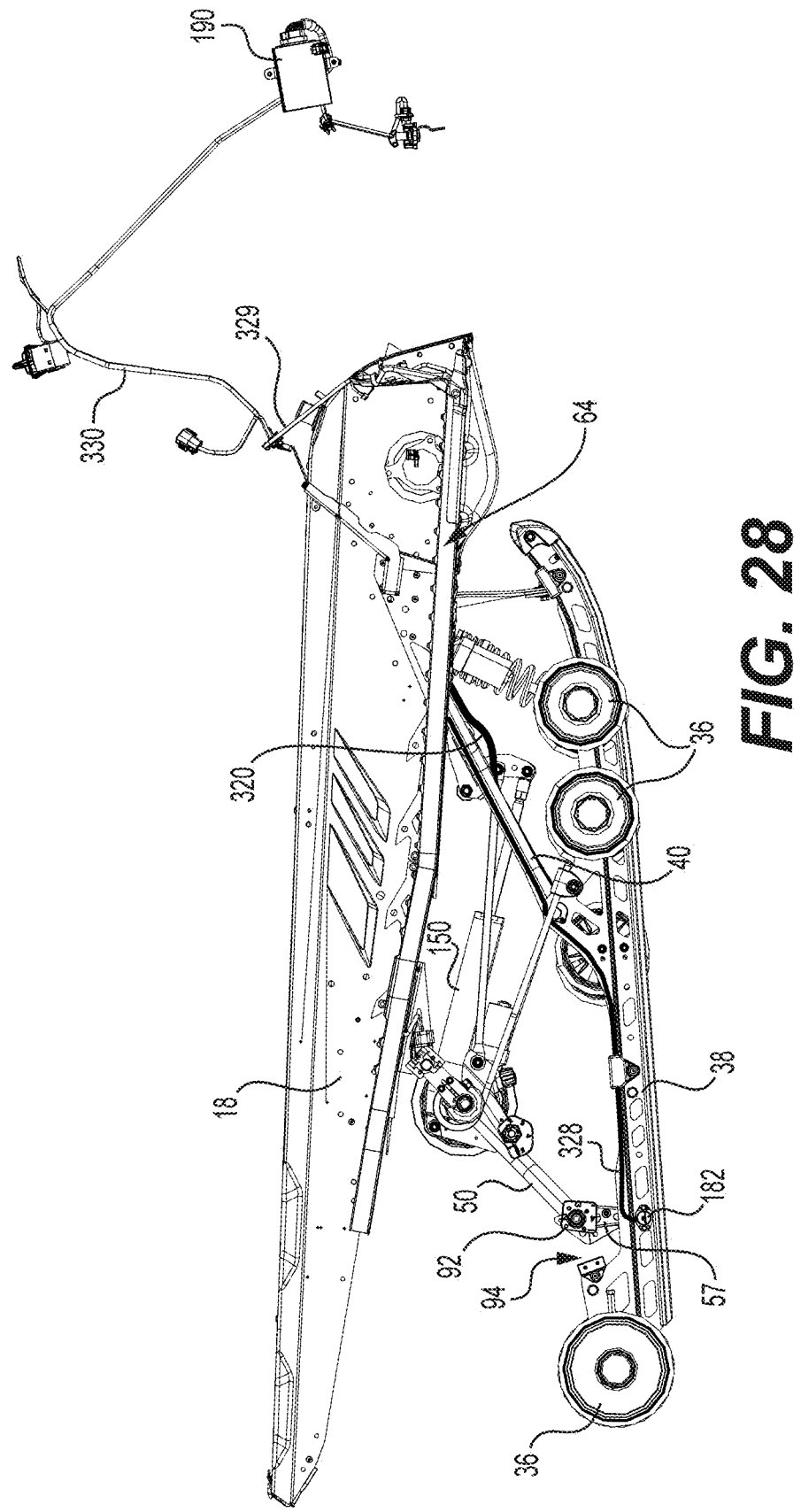
FIG. 28 is a right side elevation view of the tunnel, the rear suspension assembly and the wire harness according to yet another embodiment.

A similar configuration as that shown in FIG. 28 could also be implemented for the sensor 172 to sense the angular position of the lower end 45 of the front suspension arm 40. Notably, the sensor 172 could be connected to the right or left slide rail 38 and a corresponding magnet connected to the lower end 45 of the front suspension arm 40. Alternatively, the sensor 172 could be connected to the lower end 45 of the front suspension arm 40 and the magnet connected to the slide rail 38.

In some embodiments, the snowmobile 10 could include two sensors such as the sensor 182 to sense the angular position of the rear suspension arm 50. For instance, the sensor 182 could be positioned as shown in FIG. 28 and an additional sensor could be positioned in the same manner as the sensor 182 in FIG. 27. As such, the input of the sensor 182 and the additional sensor could be used in combination to obtain the angular position of the rear suspension arm 50 with greater precision.

Each of the sensors 172, 182 is communicatively connected to the controller 190. The controller 190 receives signals from the sensors 172, 182 indicating an angular position of the suspension arms 40, 50. It is contemplated that the sensors 172, 182 could be connected to another computer-implemented controller other than the controller 190 connected to the front suspension assemblies 72 in some implementations.

In embodiments in which the snowmobile 10 also has an additional sensor (in addition to the sensor 182) to sense the angular position of the rear suspension arm 50 as described above, the additional sensor is also communicatively connected to the controller 190 to receive signals therefrom indicative of the angular position of the rear suspension arm 50.

As is mentioned above, the shock absorber 140 in the present embodiment has selectively variable damping, similarly to the shock absorbers 75 of the front suspension assemblies 72. As such, the shock absorber 140 includes an electronic solenoid valve (not shown) that controls the hydraulic fluid flow between different chambers of the shock absorber cylinder. It is contemplated that different forms of electronically controlled shock absorbers could be used, including for example, shock absorbers using magnetorheological damping fluid.

The shock absorber 140 is communicatively and electronically connected to the controller 190 and the shock absorber 140 receives electronic signals to control the selectively variable damping therefrom. In the present implementation, the selectively variable damping of the shock absorber 140 has an inverse relationship with an electrical current received by the shock absorber 140, with the damping decreasing with increasing currents applied to the shock absorber 140. It is contemplated that the selectively variable damping could be controlled by a different mechanism. Control of the selectively variable damping of the shock absorber 140 will be described in more detail below.

As mentioned above, the shock absorber 150 could include selectively variable damping in some implementations rather than the shock absorber 140. For instance, in the embodiment of FIGS. 14 to 21, the rearward rear shock absorber 150 has selectively variable damping instead of the forward rear shock absorber 140 and thus includes an electronic solenoid valve (not shown) that controls the hydraulic fluid flow between different chambers of the shock absorber cylinder. The shock absorber 150 is thus communicatively connected to the controller 190 rather than the shock absorber 140. Different forms of electronically controlled shock absorbers could also be used, including for example, shock absorbers using magnetorheological damping fluid. In yet other embodiments, both the shock absorbers 140, 150 could have selectively variable damping (in which case both shock absorber 140, 150 would be communicatively connected to the controller 190).

As will be described in more detail below, the damping of the shock absorber 140 and/or the shock absorber 150 can be selectively varied in response to a user-selected suspension setting and in response to detected events (in a control method for reducing the risk of bottoming out, for example). The controller 190 is communicatively connected to a user input module (not shown), which includes, for one non-limiting example, a knob for selecting the desired ride setting. In some implementations, the input module could include buttons or a touch-screen for receiving the selection from the user.

The shock absorber 140 (and/or the shock absorber 150) and the shock absorbers 75 include selectively variable damping to provide an adjustable ride for the user. The controller 190 has stored within it a plurality of pre-determined ride settings, for example sport mode or touring mode, from which the user can select to have a desired suspension mode. As is mentioned above, the controller 190 is communicatively connected to the input module for receiving the desired ride setting indication from the user.

As will be described below, the shock absorber 140 and/or the shock absorber 150 and/or the shock absorbers 75 can further be controlled to adjust their damping in response to sensed events determined from measurement of the stroke and/or piston velocity of the shock absorbers 75, 140, 150. These events include, as one non-limiting example, when the piston velocity of the shock absorbers 140, 150 exceeds a pre-determined threshold that indicates that the snowmobile 10 risks bottoming out. In response, the damping of the shock absorber 140 and/or the shock absorber 150 and/or the shock absorbers 75 can be increased to reduce the risk of bottoming out. This example and others will be described in more detail below.

It is understood that, in embodiments in which the shock absorber 150 has selectively variable damping, the damping of the rearward rear shock absorber 150 can be varied in place of the damping of the forward rear shock absorber 140, or varied in addition to the damping of the forward rear shock absorber 140.

With reference to FIGS. 22 to 25, a method 200 of controlling and monitoring of the rear suspension assembly 100 by the controller 190, including determining the stroke and piston velocity of the rear shock absorbers 140, 150, will now be described.

The method 200 begins at step 210, with sensing, by the sensor 172, the angular position and the angular velocity of the front suspension arm 40 relative to the tunnel 18. In some implementations, the sensor 172 may sense only one of the angular position and the angular velocity of the front suspension arm 40. The sensor 172, being communicatively connected to the controller 190, sends the measured angular position and/or angular velocity to the controller 190. It is contemplated that the sensor 172 could store the information on the measured angular position and/or angular velocity in a memory in or connected to the sensor 172, and that the controller 190 could retrieve the stored information subsequently.

The method 200 continues at step 220, with sensing, by the sensor 182, the angular position and the angular velocity of the rear suspension arm 50 relative to the tunnel 18. In some implementations, the sensor 182 may sense only one of the angular position and the angular velocity of the rear suspension arm 50. The sensor 182 similarly sends the measured angular position and/or angular velocity to the controller 190. It is contemplated that the sensor 182 could store the information on the measured angular position and/or angular velocity in a memory in or connected to the sensor 182, and that the controller 190 could retrieve the stored information subsequently.

While presented in a sequential manner above, it is contemplated that the steps 210 and 220 could be performed simultaneously (i.e. in parallel) or in the reverse order. Moreover, as discussed above, the angular position and the angular velocity of the suspension arms 40, 50 can be sensed by the sensors 172, 182 at different locations of the suspension arms 40, 50 (e.g., the upper ends, the lower ends, etc.). It is contemplated that the steps 210, 220 could include determining the angular position and the angular velocity at different points of the suspension arms 40, 50, depending on the implementation.

The method 200 then terminates at step 230, with the controller 190 determining at least one of the stroke and the piston velocity of the shock absorbers 140, 150 based on the angular position and/or velocity of the suspension arms 40, 50 determined in steps 210, 220. It is contemplated that the stroke and/or piston velocity for only one of the shock absorbers 140, 150 may be calculated in some implementations or iterations of the method 200. It is also contemplated that the stroke and/or piston velocity for only the shock absorber 140 may be calculated in some implementations or iterations of the method 200.

The stroke for each of the shock absorbers 140, 150 is calculated based on the geometry of the rear suspension assembly 100. The lengths of the rigid linking members (i.e. the front suspension arm 40, the rear suspension arm 50, etc.) are known, as are their relative placement (where each bar is connected to the others). The sensors 172, 182 provide the angular position of the suspension arms 40, 50, from which can be determined the relative angles between the rigid members. As the end points of the shock absorbers 140, 150 are known relative to the rigid members, the overall length of the shock absorbers 140, 150 can thus be determined. Piston velocity is calculated based on the changes in stroke over time, as determined by the controller 190. In some implementations, the controller 190 could determine the piston velocities of the shock absorbers 140, 150 by using the angular velocities of the suspension arms 40, 50 to calculate the piston velocities based on the geometry described above similarly to determining the stroke.

In the present implementation, stroke values of the shock absorbers 140, 150 related to a plurality of angular positions of the suspension arms 40, 50 are pre-calculated and stored in a table saved in the memory accessible by the controller 190. As such, the controller 190 simply retrieves the stroke values from the table based on angular position measurements retrieved from the sensors 172, 182. For values of angular position intermediate to those listed in the table, the controller 190 interpolates the corresponding stroke value. In some implementations, it is contemplated that the controller 190 could calculate the stroke values based on the angular position measurements retrieved from the sensors 172, 182 in real time.

While the method 200 may fully terminate at step 230, the method 200 is generally performed repetitively in order to provide monitoring of the rear suspension assembly 100. In operation of the snowmobile 10, the method 200 is thus generally restarted from step 210 once after step 230 has been completed. This assures that any events, as will be described in more detail below, can be detected in order to control the rear suspension assembly 100.

In some implementations, the method 200 could include sensing, by the sensors 79, the stroke and/or piston velocity of the right and left front shock absorbers 75. The controller 190 could then further control the shock absorbers 75 and/or 140 and/or 150 depending on the stroke and/or piston velocity of any of the shock absorbers 75, 140, 150. Some possible implementations including control of the front shock absorbers 75 are described further below.

In some implementations, the method 200 could further include receiving, by the controller 190, an indication of the user-selected suspension setting. In such a case, the method 200 would include adjusting the current supplied to one or more of the shock absorbers 140, 150, 75, in order to increase or decrease the damping, based on the user-selected suspension setting. Depending on when the controller 190 receives the indication of the user-selected suspension setting, the method 200 could include adjusting the damping of the shock absorbers 140, 150, 75 before, after or between any of the steps of the method 200 described above or below.

Figure 23:
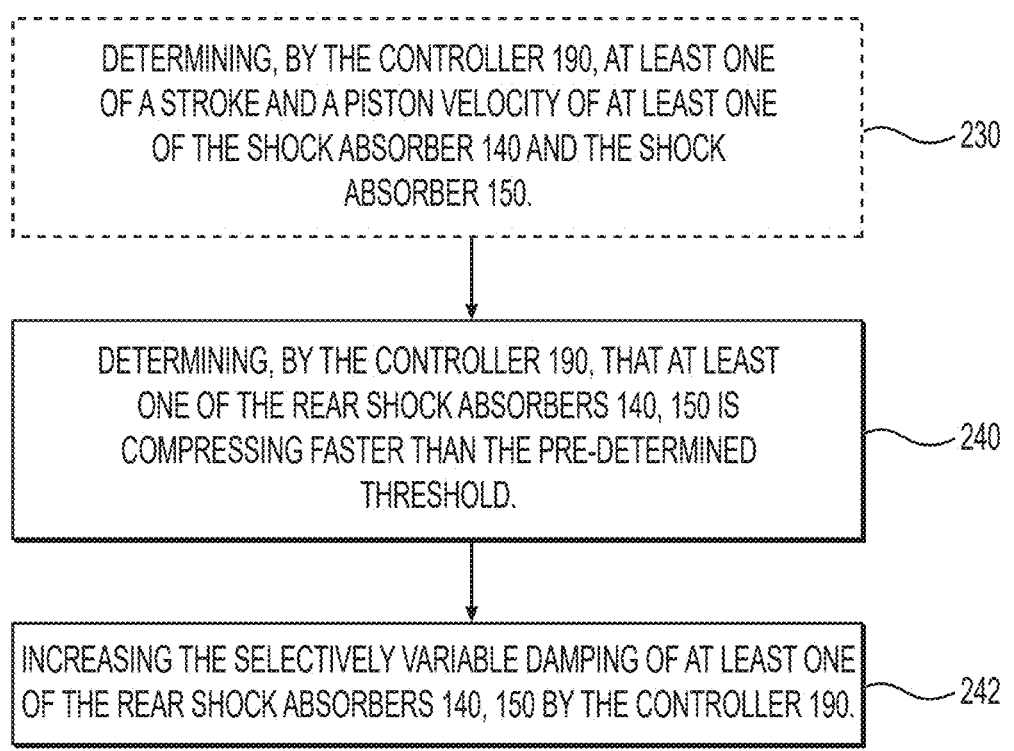
FIG. 23 is a flow chart illustrating additional possible steps in the method of FIG. 22.

With reference to FIG. 23, further steps, implemented in some implementations or iterations of the method 200, will now be described. The steps illustrated are generally aimed at reducing the risk of the snowmobile 10 bottoming out, although it is contemplated that the same steps may be implemented even when the snowmobile 10 is not likely to bottom out.

The method 200 continues at step 240, following step 230, with determining, by the controller 190, that one or both of the rear shock absorbers 140, 150 is compressing faster than a pre-determined threshold.

The pre-determined threshold corresponds to the piston velocity and/or stroke position (or a combination of both) that indicates that the rear suspension 100 may be at risk of bottoming out. The pre-determined threshold is stored to computer-implemented storage in or connected to the controller 190, although it is contemplated that the threshold could be calculated by the controller 190 at various points in time. The threshold depends on various factors, including but not limited to: the user-selected suspension setting, the specific model of the snowmobile 10, forward velocity of the snowmobile 10, and the geometry of the suspension assembly 100.

For example, the threshold for shock absorbers 140, 150 set to "touring mode" may be lower than when set to other modes with higher damping. Touring mode sets the shock absorber 140 and/or the shock absorber 150 and/or the shock absorbers 75 to a lower damping setting, such that the one or more riders do not feel the smaller bumps of the riding path, as the shock absorbers 75, 140, 150 more readily compress compared to other higher damping settings. By more readily compressing, the snowmobile 10 also more easily compresses down to the point of bottoming out, and the corresponding threshold for the touring mode will generally be set such that the method 200 reacts more quickly to counteract the risk of bottoming out.

The method 200 then continues in step 242 with increasing the selectively variable damping of the shock absorber 140 by the controller 190, based on the determination of step 240 that there is a risk of bottoming out. If no determination is made that the snowmobile 10 risks bottoming out, the method 200 returns to step 210.

The magnitude of the increase in damping depends on many factors, including but not limited to: the user-selected suspension setting, the determined piston velocity, and the stroke and/or piston velocity of the shock absorbers 75. The touring mode setting, for example, starts with a lower damping on the rear shock absorber 140 and/or 150 and may need a greater increase in damping compared to a mode that begins with a higher damping setting.

As is described above, the selectively variable damping of the shock absorber 140 and/or the shock absorber 150 is increased by decreasing the electrical current supplied to the shock absorber 140 and/or the shock absorber 150. Depending on the implementation, the snowmobile 10 could include a shock absorber 140, 150 that relies on a different mechanism to vary the damping, and the step 242 would in turn include controlling the shock absorber 140, 150 in a corresponding manner.

It is contemplated that the method 200 could further include steps to monitoring the stroke and/or piston velocities of the front shock absorbers 75, as is mentioned above. In such a case, the method 200 could further include corresponding steps to reduce the risk of a front portion of the snowmobile 10 bottoming out, including determining that the stroke and/or piston velocity of the shock absorbers 75 have passed a pre-determined threshold and increasing the damping of the shock absorbers 75.

In some implementations, the method 200 could further include the controller 190 returning the selectively variable damping of the shock absorber 140 and/or the shock absorber 150 to the damping setting corresponding to the user-selected suspension setting after completing step 242. For example, if the user has selected the touring mode, but the controller 190 has increased the damping on the shock absorber 140 and/or the shock absorber 150 in order to reduce the risk of bottoming out, the controller 190 could then return the shock absorber 140 and/or the shock absorber 150 to the low damping of the touring mode once the risk of bottoming out has been determined to be past. For example, the method 200 could include determining that the shock absorbers 140, 150 have begun expanding or are no longer compressing, subsequent the determining that there was a risk of bottoming out, and then subsequently returning the shock absorber 140 and/or the shock absorber 150 to the previously selected damping setting. In some implementations, the controller 190 could return the selectively variable damping of the shock absorber 140 and/or the shock absorber 150 to a default damping setting.

After step 242, the method 200 then either terminates, or cycles back to steps 210, 220 as discussed above in order to continue monitoring and controlling the suspension assemblies 72, 100.

With reference to FIG. 24, additional or alternative steps implemented in some iterations of the method 200 will now be described. In the steps illustrated in FIG. 24, the information on the stroke and piston velocity allows the controller 190 to further control the shock absorber 140 and/or the shock absorber 150 and/or the shock absorbers 75 when the controller 190 determines that the snowmobile 10 has at least partially lost contact with the ground.

In some iterations, following step 230, the method 200 continues, either sequentially or in parallel with the steps described above, with sensing, by the left sensor 79, at least the stroke of the left front shock absorber 75 at step 250. The method 200 further continues with sensing, by the right sensor 79, at least the stroke of the right front shock absorber 75 at step 252. Similarly to the steps 210, 220 above, it is contemplated that the steps 250 and 252 could be performed simultaneously or in the reverse order. It is also contemplated that the steps 210, 220, 250, and 252 could all be performed simultaneously or in any order.

The method 200 then continues at step 254 with determining, by the controller 190, that at least one of the shock absorbers 140, 150, 75 is in a maximum extension position. The maximum extension position of a shock absorber corresponds to the largest stroke value possible. This position generally corresponds to a corresponding portion of the snowmobile 10 having lost contact with the ground, as the maximum stroke is caused by gravity exerting a downward force on the shock absorber that is not counteracted by the ground. Depending on the situation, any one or more of the shock absorbers 140, 150, 75 could be determined to be at maximum extension. When the snowmobile 10 has completely lost contact with the ground, all of the shock absorbers 140, 150, 75 could be determined to be at maximum extension.

Once at least one of the shock absorbers 140, 150, 75 has been determined to be at maximum stroke, the method 200 then continues with increasing, by the controller 190, the selectively variable damping of one or more of the shock absorbers 140, 150, 75 at step 256. In some implementations, the same shock absorber 140, 150, 75 that is determined to be at maximum stroke could be the shock absorber 140, 150, 75 that experiences an increase in damping. In some cases, including where the shock absorber 150 has been determined to be at maximum stroke, the controller 190 could increase the damping of a different one of the shock absorbers 140, 75. In some cases, the controller 190 could increase the damping of one or more of the shock absorbers 140, 150, 75 only when all shock absorbers 140, 150, 75 are determined to be at maximum extension.

In some implementations, the method 200 could include determining a duration of time that the one or more shock absorbers 140, 150, 75 have been in the maximum extension position. In such a case, the method 200 could further include increasing the selectively variable damping or one or more of the shock absorbers 140, 150, 75 based on the duration of time. In some implementations, the method 200 could only increase damping of the shock absorbers 140, 150, 75 when the one or more shock absorbers 140, 150, 75 have been in the maximum extension position for at least a certain duration of time. In some implementations, the longer the duration of time that the one or more shock absorbers 140, 150, 75 have been in the maximum extension position, the greater the increase of damping is applied to one or more of the shock absorbers 140, 150, 75 (up to a maximum damping value).

In some implementations, the method 200 could further include the controller 190 returning the selectively variable damping of the shock absorber 140, 150 to the user-selected suspension setting after completing step 256. For example, the method 200 could include determining that the shock absorbers 140, 150 are no longer at maximum extension, subsequent to increasing the damping of one or more of the shock absorbers 140, 150, 75, and then subsequently returning the one or more of the shock absorbers 140, 150, 75 to the previously selected damping setting. In some cases, the method 200 could return the one or more of the shock absorbers 140, 150, 75 to the previous damping setting only after a certain time delay, to reduce the risk of bottoming out subsequent to returning from the maximum extension position. In some implementations, the controller 190 could return the selectively variable damping of the shock absorber 140, 150 to a default damping setting.

After step 256, the method 200 cycles back to steps 210, 220 as discussed above in order to continue monitoring and controlling the suspension assemblies 72, 100.

With reference to FIG. 25, additional or alternative steps implemented in some iterations of the method 200 will now be described. In the steps illustrated, the information on the stroke and piston velocity allows the controller 190 to further determine if the snowmobile 10 is carrying a load in addition to the driver of the snowmobile 10.

In some iterations, following or in parallel with the method steps described above, the method 200 continues at step 260 with determining a mean compression of the shock absorbers 140, 150, 75, based at least on the stroke and/or piston velocity of each of the shock absorbers 140, 150, 75. The mean compression is the average stroke of each of the shock absorbers 140, 150, 75 due to the weight of the snowmobile components supported by the rear suspension assembly 100, the rider, and any other load being carried by the snowmobile 10. The additional load could include, but is not limited to, one or more additional passengers, storage accessories, baggage, professional equipment, recreational gear, and safety equipment.

The method 200 then continues at step 262 with determining by the controller 190, based on the mean compression determined, that the snowmobile 10 is carrying a load that corresponds to more than a single user or rider. In some implementations, the determination that the snowmobile 10 is carrying an additional load could be determined by comparing the mean compression to an earlier measurement of mean compression. It is also contemplated that the controller 190 could include stored information related to a nominal weight and/or nominal mean compression value corresponding to the snowmobile 10 carrying only a single rider.

In some cases, it is contemplated that various steps of the method 200, such as those described above with reference to FIGS. 23 and 24, could be varied based on the determination that the snowmobile 10 is carrying an additional load. For example, when determining if one of the shock absorbers 140, 150, 75 is compressing faster than the pre-determined threshold in step 240, the method 200 could further take the additional load into account, such that a different pre-determined threshold is chosen for comparing to the piston velocities of the shock absorbers 140, 150, 75. In this way, the risk of bottoming out can be managed in view of the additional weight.

In another non-limiting example of the method 200, the controller 190 could control the front shock absorbers 75 in response to determining that the snowmobile 10 is turning based on relative motion between the front shock absorbers 75.

In such an implementation, the method 200 could include determining a relative motion between the left front shock absorber 75 and the right front shock absorber 75 based on the stroke and/or piston velocity of each of the shock absorbers 75. The method 200 would then further include changing the selectively variable damping of at least one of the shock absorbers 75, based on their relative motion. In some cases, this could include increasing a rebound damping of the shock absorber 75 that is determined to be on the inside of the turn.

It is contemplated that the method 200 could include additional or different steps, either to perform additional functions and/or to perform the steps described above. It is also contemplated that the steps could be performed in an assortment of different sequences and is not limited to the order set forth in the explanation above. For example, it is contemplated that the steps 210, 220, 250, and 252 could be performed simultaneously or in an assortment of different sequences. As is mentioned above, it is further contemplated that in some iterations of the method 200, different steps could repeat and cycle more often than other steps. For example, steps 210 and 220 could repeat at a different frequency than steps 250 and 252.

Figure 21:
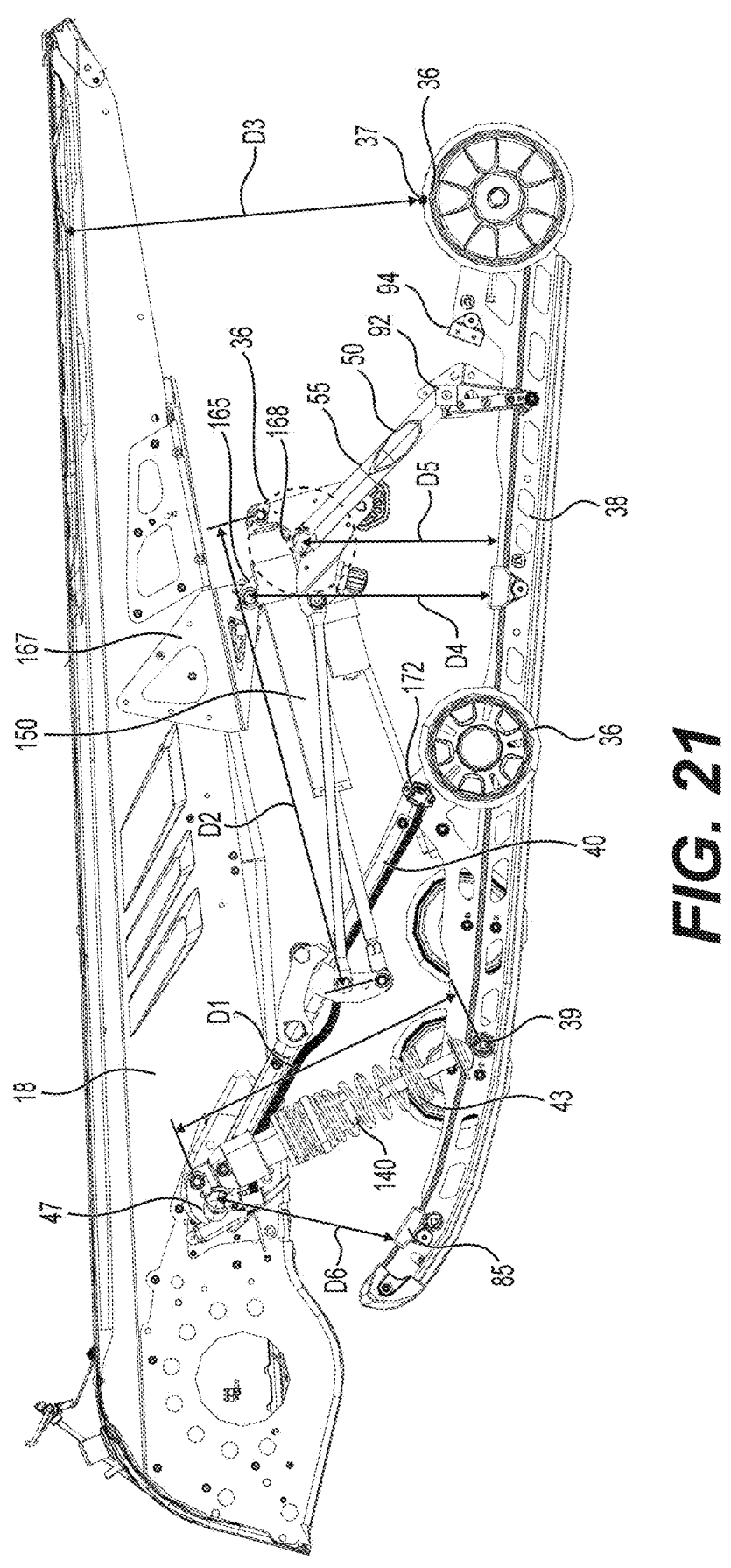
FIG. 21 is a cross-sectional view of the tunnel and the rear suspension of FIG. 15 taken along a longitudinal plane of the snowmobile.

With reference to FIG. 26, in some embodiments, the method 200 also includes determining distances associated with the rear suspension assembly 100 in order to adjust or maintain the selectively variable damping of the forward rear shock absorber 140 and/or the rearward rear shock absorber 150. More specifically, the method 200 performs steps 210, 220 described above by sensing the angular positions of the suspension arms 40, 50 by the sensors 172, 182. At a next step 430, the controller 190 determines a plurality of distances D1, D2, D3, D4, D5, D6 (FIG. 21) associated with the rear suspension assembly 100 which, when they have certain values, can be indicative of a suggested or required adjustment of the selectively variable damping of the forward rear shock absorber 140 and/or the rearward rear shock absorber 150. Specifically, some of the distances are distances between the slide rails 38 and different components of the snowmobile 10. With reference to FIG. 21, these distances include: a distance D1 between the lower end of the forward rear shock absorber 140 (at the cross-bar 39) and the upper end of the forward rear shock absorber 140 (i.e., the length of the forward rear shock absorber 140); a vertical distance D4 between the slide rails 38 and the pivot defined by the rigid member 165 with the bracket 167 which interconnects the rear suspension arm 50 and the tunnel 18; a vertical distance D5 between slide rails 38 and the upper end of the rear suspension arm 50 (i.e., between the slide rails 38 and an axis of the shaft 168); and a distance D6 between a front stopper 85 of the slide rails 38 and the upper end 41 of the front suspension arm 40 (at the upper bar 47). In addition, the controller 190 determines: a distance D2 between the front and rear ends of the rearward rear shock absorber 150; and a distance D3 between an uppermost point 37 of the rear idler wheels 36 and an inner surface of the top wall of the tunnel 18. At optional step 440, the controller 190 can also determine the rates of change of the distances D1, D2, D3, D4, D5, D6. At step 450, the controller compares the distances D1, D2, D3, D4, D5, D6 with corresponding pre-determined threshold distances which would be indicative that the selectively variable damping of the forward rear shock absorber 140 and/or rearward rear shock absorber 150 should be increased. Based on the comparison, at step 460, the controller 190 adjusts (e.g., increases or decreases) the selectively variable damping of the forward rear shock absorber 140 and/or the rearward rear shock absorber 150 when one or more of the distances D1, D2, D3, D4, D5, D6 exceeds the corresponding pre-determined threshold distance(s). A similar comparison can be done between the rate of change of the distances D1, D2, D3, D4, D5, D6 and pre-determined threshold rates of change associated with the distances D1, D2, D3, D4, D5, D6 and an ensuing adjustment of the selectively variable damping of the forward rear shock absorber 140 and/or the rearward rear shock absorber 150 can be carried out if the one or more of the rates of change of the distances D1, D2, D3, D4, D5, D6 exceeds the corresponding pre-determined threshold rate(s) of change. Determination of the distances D1, D2, D3, D4, D5, D6 allows the system to evaluate different areas of the rear suspension assembly 100 which can be helpful given that the rear suspension assembly 100 acts a 5 bar mechanism and therefore some areas associated with the distances D1, D2, D3, D4, D5, D6 can be in a normal geometric configuration while others are in "abnormal" geometric configurations that indicate that the shock absorber 140 is bottoming out.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A snowmobile comprising:
a chassis including a tunnel;
a motor connected to the chassis;
at least one ski connected to the chassis;
an endless drive track disposed at least in part below the tunnel and operatively connected to the motor for propulsion of the snowmobile;
a rear suspension assembly supporting and tensioning the endless drive track, the rear suspension assembly including:
at least one suspension arm having an upper end and a lower end, the upper end of the at least one suspension arm being pivotably connected to the tunnel;
a pair of slide rails pivotably connected to the lower end of the at least one suspension arm; and
at least one rear shock absorber biasing the pair of slide rails away from the tunnel;
a right front suspension assembly and a left front suspension assembly, each of the left and right front suspension assembly including:
a ski leg;
an upper A-arm and a lower A-arm, the upper and lower A-arms being connected between the ski leg and the chassis; and
a shock absorber connected between one of the upper and lower A-arms and the chassis;

a first sensor connected between one of the upper and lower A-arms of the right front suspension assembly and the chassis to measure the angle between the one of the upper and lower A-arms and the chassis;
a second sensor connected between one of the upper and lower A-arms of the left front suspension assembly and the chassis to measure the angle between the one of the upper and lower A-arms and the chassis; and
a controller communicatively connected to the first sensor and the second sensor to receive electronic signals therefrom, the electronic signals representing angular position between the one of the upper and lower A-arms of the right front suspension assembly, the one of the upper and lower A-arms of the left front suspension assembly, and the chassis.

2. The snowmobile of claim 1, wherein:
the right front suspension assembly further comprises two right rigid linkages connecting the first sensor to the upper A-arm of the right front suspension assembly; and
the left front suspension assembly further comprises two left rigid linkages connecting the second sensor to the upper A-arm of the left front suspension assembly.

3. The snowmobile of claim 2, wherein the first sensor and the second sensor are connected to the chassis.

4. The snowmobile of claim 1, wherein at least one of the shock absorber of the right front suspension assembly and the shock absorber of the left front suspension assembly has selectively variable damping.

5. The snowmobile of claim 4, wherein the at least one of the shock absorber of the right front suspension assembly and the shock absorber of the left front suspension assembly is communicatively connected to the controller for controlling the selectively variable damping.

6. The snowmobile of claim 1, wherein:
the shock absorber of the right front suspension assembly has selectively variable damping; and
the shock absorber of the left front suspension assembly has selectively variable damping.

7. The snowmobile of claim 6, wherein, for each of the right and left front suspension assembly, the controller controls the selectively variable damping of the shock absorber based at least in part on the electronic signals received from a corresponding one of the first and second sensors.

8. The snowmobile of claim 1, wherein, for each of the right and left front suspension assembly, the shock absorber is connected between the lower A-arm and the chassis.

* * * * *